(12) United States Patent  (10) Patent No.: US 11,663,487 B2
Kubota et al.  (45) Date of Patent: May 30, 2023

(54) ANALYSIS APPARATUS, NON-TRANSITORY COMPUTER-READABLE STORAGE MEDIUM FOR ANALYSIS PROGRAM, AND ANALYSIS METHOD

(71) Applicant: FUJITSU LIMITED, Kawasaki (JP)

(72) Inventors: Tomonori Kubota, Kawasaki (JP); Yasuyuki Murata, Shizuoka (JP)

(73) Assignee: FUJITSU LIMITED, Kawasaki (JP)

( * ) Notice: Subject to any disclaimer, the term of this patent is extended or adjusted under 35 U.S.C. 154(b) by 434 days.

(21) Appl. No.: 17/031,966

(22) Filed: Sep. 25, 2020

(65) Prior Publication Data
US 2021/0133481 A1   May 6, 2021

(30) Foreign Application Priority Data
Nov. 5, 2019   (JP) .............................. JP2019-200863

(51) Int. Cl.
   *G06N 3/084* (2023.01)
   *G06N 5/04* (2023.01)
   *G06F 18/214* (2023.01)
   *G06V 10/82* (2022.01)

(52) U.S. Cl.
   CPC ......... *G06N 3/084* (2013.01); *G06F 18/2155* (2023.01); *G06N 5/04* (2013.01); *G06V 10/82* (2022.01)

(58) Field of Classification Search
   None
   See application file for complete search history.

(56) References Cited

U.S. PATENT DOCUMENTS

| 11,361,226 B2 * | 6/2022 | Kubota | G06V 10/776 |
| 11,436,431 B2 * | 9/2022 | Kubota | G06V 10/82 |
| 2015/0332126 A1 | 11/2015 | Hikida | |
| 2020/0380318 A1 * | 12/2020 | Kubota | G06V 10/764 |

FOREIGN PATENT DOCUMENTS

| JP | 2016-033806 A | 3/2016 |
| JP | 2016-147325 A | 8/2016 |
| JP | 2018-045350 A | 3/2018 |
| JP | 2018-097807 A | 6/2018 |

OTHER PUBLICATIONS

Ramprasaath R. Selvaraju et al.,"Grad-CAM: Visual Explanations from Deep Networks via Gradient-based Localization", The IEEE International Conference on Computer Vision (ICCV), pp. 618-626, 2017 (Total 9 page).

* cited by examiner

*Primary Examiner* — Dov Popovici
(74) *Attorney, Agent, or Firm* — Fujitsu Patent Center

(57) ABSTRACT

A method includes: generating a refine image having a maximized correct label score of inference from an incorrect image from which an incorrect label is inferred by a neural network; generating a third map by superimposing a first map and a second map, the first map indicating pixels to each of which a change is made in generating the refine image, of a plurality of pixels of the incorrect image, the second map indicating a degree of attention for each local region in the refine image, the each local region being a region that has drawn attention by the neural network; and specifying a set of pixels that cause incorrect inference in the incorrect image by calculating a pixel value of the third map for each set of pixels, wherein the map generating processing adjusts the second map based on appearance frequency of each degree of attention.

6 Claims, 28 Drawing Sheets

(AMOUNT OF OFFSET = 0)

(AMOUNT OF OFFSET = 128)

ANALYSIS APPARATUS, NON-TRANSITORY COMPUTER-READABLE STORAGE MEDIUM FOR ANALYSIS PROGRAM, AND ANALYSIS METHOD

CROSS-REFERENCE TO RELATED APPLICATION

This application is based upon and claims the benefit of priority of the prior Japanese Patent Application No. 2019-200863, filed on Nov. 5, 2019, the entire contents of which are incorporated herein by reference.

FIELD

The embodiments discussed herein are related to an analysis apparatus, a non-transitory computer-readable storage medium storing an analysis program, and an analysis method.

BACKGROUND

In recent years, analysis techniques have been proposed that analyze a cause of incorrect inference when an incorrect label is inferred in an image recognition process using a convolutional neural network (CNN). Such techniques include the activation maximization method. There are proposed the analysis techniques for analyzing an image section that draws attention at the time of inference in the image recognition process. Such techniques include a back propagation (BP) method and a guided back propagation (GBP) method.

The activation maximization method is a method of specifying, as an image section that causes incorrect inference, a changed portion when an input image is changed so that a correct label of inference has a maximum score. The BP method or the GBP method is a method of visualizing a feature portion that responds at the time of inference, by back propagating from an inferred label and tracing to an input image.

Examples of the related art include Japanese Laid-open Patent Publication Nos. 2018-097807 and 2018-045350.

Examples of the related art also include Ramprasaath R. Selvaraju, et al.: Grad-cam: Visual explanations from deep networks via gradient-based localization. The IEEE International Conference on Computer Vision (ICCV), pp. 618-626, 2017.

SUMMARY

According to an aspect of the embodiments, provided is an analysis method implemented by a computer, the method including: executing a refine image generating processing configured to generate a refine image having a maximized correct label score of inference from an incorrect inference image from which an incorrect label is inferred by a neural network; executing a map generating processing configured to generate a third map by superimposing a first map and a second map, the first map indicating pixels to each of which a change is made in generating the refine image, of a plurality of pixels of the incorrect inference image, the second map indicating a degree of attention for each local region in the refine image, the each local region being a region that has drawn attention at the time of inference by the neural network, and the third map indicating a degree of importance for each pixel for inferring a correct label; and executing a specifying processing configured to specify a set of pixels that cause incorrect inference in the incorrect inference image, by calculating a pixel value of the third map for each set of pixels, wherein the map generating processing is configured to adjust the second map based on appearance frequency of each degree of attention.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

Figure 1:
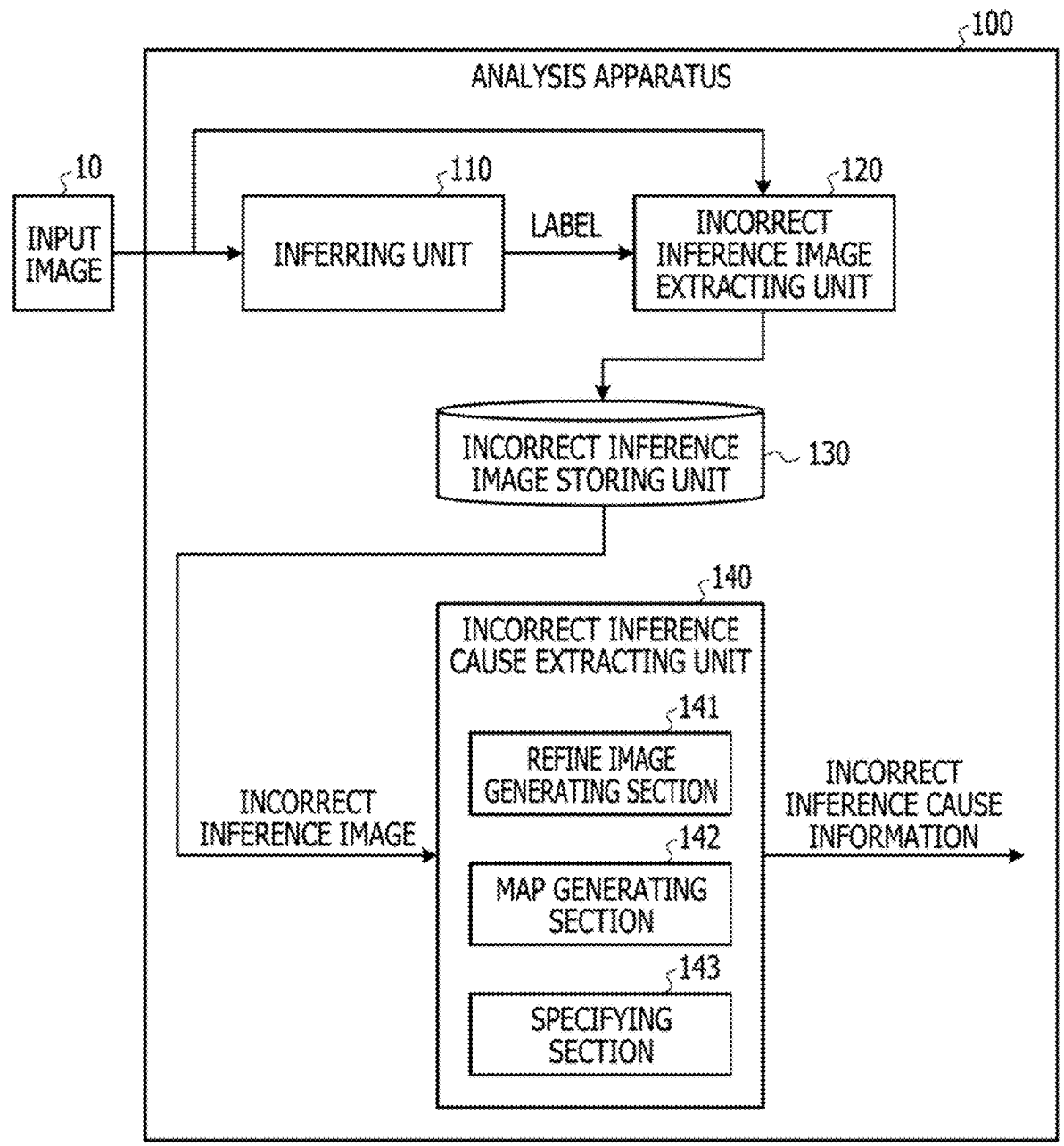
FIG. 1 illustrates an example of a functional configuration of an analysis apparatus.

There is, however, a circumstance that the above-described analysis techniques may not specify an image section that causes incorrect inference with adequately high precision.

In an aspect of embodiments, provided is a solution to improve precision in specifying an image section that causes incorrect inference.

Hereinafter, embodiments are described with reference to the accompanying drawings. In the present specification and drawings, components having substantially same functional configurations are assigned with same reference numerals, and overlapping description is omitted.

First Embodiment

<Functional Configuration of Analysis Apparatus>

First, a functional configuration of an analysis apparatus according to a first embodiment is described. FIG. 1 illustrates an example of the functional configuration of the analysis apparatus. In an analysis apparatus 100, analysis programs are installed, and execution of the programs causes the analysis apparatus 100 to function as an inferring unit 110, an incorrect inference image extracting unit 120, and an incorrect inference cause extracting unit 140.

The inferring unit 110 performs an image recognition process using a pre-trained CNN. For example, upon input of an input image 10, the inferring unit 110 infers a label indicating a type of an object contained in the input image 10 (a type of a vehicle in the present embodiment) and outputs the inferred label.

The incorrect inference image extracting unit 120 determines whether a (known) label indicating the type of the object contained in the input image 10 matches the label inferred by the inferring unit 110. The incorrect inference image extracting unit 120 extracts, as an "incorrect inference image", an input image that is determined not to match (an incorrect label is inferred), and stores the "incorrect inference image" in an incorrect inference image storing unit 130.

The incorrect inference cause extracting unit 140 specifies an image section that causes incorrect inference from the incorrect inference image and outputs incorrect inference cause information. For example, the incorrect inference cause extracting unit 140 includes a refine image generating section 141, a map generating section 142, and a specifying section 143.

The refine image generating section 141 reads the incorrect inference image stored in the incorrect inference image storing unit 130. The refine image generating section 141 generates a score-maximized refine image having a maximized correct label score of inference, from the read incorrect inference image.

The map generating section 142 generates a map for identifying a region that affects inference of a label, using the known analysis techniques or the like that analyze the cause of incorrect inference.

The specifying section 143 replaces with the generated refine image the region that is contained in the generated map and affects the inference of the label, of the incorrect inference image. The specifying section 143 infers a label with the incorrect inference image in which the region has been replaced with the refine image, as an input, and determines the effect of the replacement from the score of the inferred label.

The specifying section 143 infers a label by inputting the incorrect inference image while changing a size of the region that affects the inference of the label, and specifies the image section that causes incorrect inference from the score of the inferred label. The specifying section 143 outputs the specified image section that causes incorrect inference as the incorrect inference cause information.

In this manner, when replacing a region that affects the inference of the label with the refine image, the specifying section 143 may specify, with high precision, the image section that causes incorrect inference, by referring to the effect of the replacement.

<Hardware Configuration of Analysis Apparatus>

Figure 2:
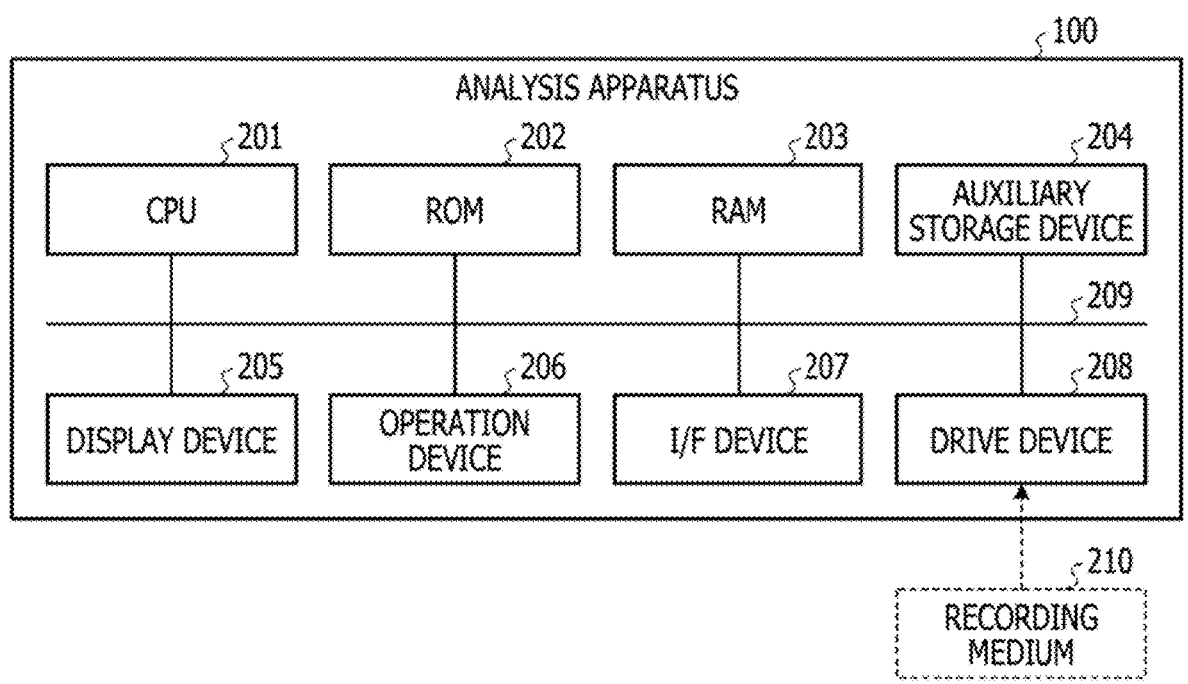
FIG. 2 illustrates an example of a hardware configuration of the analysis apparatus.

Next, a hardware configuration of the analysis apparatus 100 is described. FIG. 2 illustrates an example of the hardware configuration of the analysis apparatus. As illustrated in FIG. 2, the analysis apparatus 100 includes a central processing unit (CPU) 201, a read-only memory (ROM) 202, and a random-access memory (RAM) 203. The CPU 201, the ROM 202, and the RAM 203 form a so-called computer.

The analysis apparatus 100 includes an auxiliary storage device 204, a display device 205, an operation device 206, an interface (I/F) device 207, and a drive device 208. Each of hardware components of the analysis apparatus 100 is coupled to each other via a bus 209.

The CPU 201 is a calculating device that runs various programs (for example, an analysis program and the like) installed in the auxiliary storage device 204. Although not illustrated in FIG. 2, an accelerator (for example, a graphics processing unit (GPU)) may be combined as a calculating device.

The ROM 202 is a non-volatile memory. The ROM 202 functions as a main storage device that stores various programs, data, and the like for the CPU 201 to execute the various programs installed in the auxiliary storage device 204. For example, the ROM 202 functions as a main storage device that stores a boot program such as a Basic Input/Output System (BIOS) and an Extensible Firmware Interface (EFI).

The RAM 203 is a volatile memory such as a dynamic random-access memory (DRAM) or a static random-access memory (SRAM). The RAM 203 functions as the main storage device that provides a work area where the various programs installed in the auxiliary storage device 204 are expanded for execution by the CPU 201.

The auxiliary storage device 204 is an auxiliary storage device that stores the various programs and information to be used for execution of the various programs. For example, the incorrect inference image storing unit 130 is implemented in the auxiliary storage device 204.

The display device 205 is a display device that displays various display screens containing the incorrect inference cause information and the like. The operation device 206 is an input device for a user of the analysis apparatus 100 to input various instructions to the analysis apparatus 100.

The I/F device 207 is, for example, a communication device to couple to a network not illustrated.

The drive device 208 is a device in which a recording medium 210 is set. The recording media 210 discussed herein include media that record information optically, electrically, and magnetically like a CD-ROM, a flexible disk, a magneto-optical disk, and the like. The recording media 210 may also include a semiconductor memory and the like, such as the ROM, or a flash memory, which records information electrically.

The various programs to be installed in the auxiliary storage device 204 are installed, for example, as the distributed recording medium 210 is set in the drive device 208, and the various programs recorded in the recording medium 210 are read by the drive device 208. Alternatively, the various programs installed in the auxiliary storage device 204 may be installed by being downloaded from the network that is not illustrated.

<Functional Configuration of Incorrect Inference Cause Extracting Unit>

Figure 3:
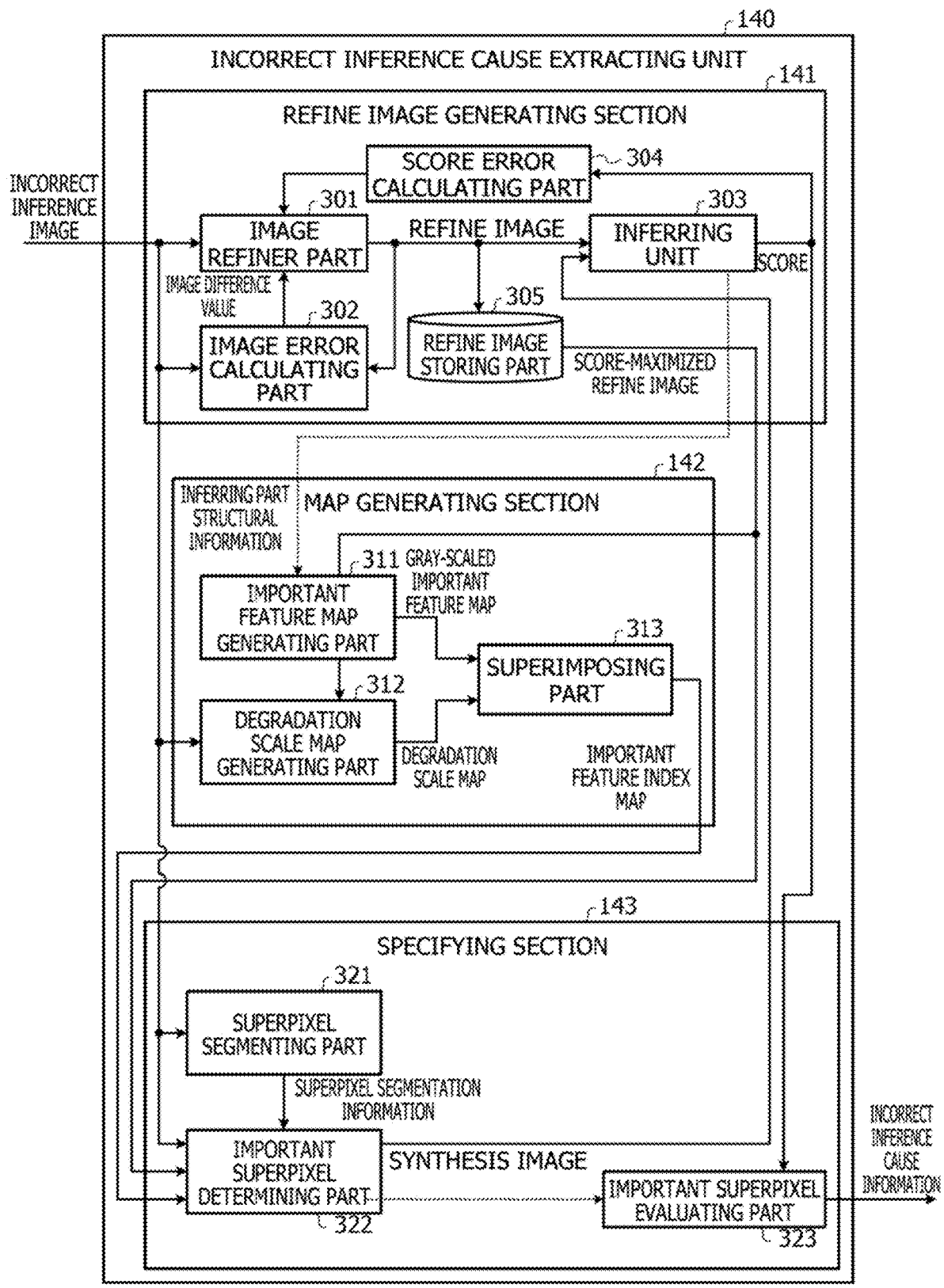
FIG. 3 is a first diagram illustrating an example of a functional configuration of an incorrect inference cause extracting unit.

Next, a functional configuration of the incorrect inference cause extracting unit 140 is described in detail among the functions implemented in the analysis apparatus 100 according to the first embodiment. FIG. 3 is a first diagram illustrating an example of the functional configuration of the incorrect inference cause extracting unit. Hereinafter, the components (the refine image generating section 141, the map generating section 142, and the specifying section 143) of the incorrect inference cause extracting unit 140 are described in detail.

(1) Details of Refine Image Generating Section

First, the refine image generating section 141 is described in detail. As illustrated in FIG. 3, the refine image generating section 141 includes an image refiner part 301, an image error calculating part 302, the inferring part 303, and a score error calculating part 304.

The image refiner part 301 generates a refine image from the incorrect inference image using the CNN as an image generation model, for example.

When making inference using the generated refine image, the image refiner part 301 changes the incorrect inference image such that the correct label score is maximized. When generating the refine image using the image generation model, for example, the image refiner part 301 generates the refine image such that an amount of change from the incorrect inference image (a difference between the refine image and the incorrect inference image) is small. This allows the image refiner part 301 to obtain an image (a refine image) visually similar to the image before being changed (the incorrect inference image).

For example, when using the CNN as the image generation model, the image refiner part 301 performs CNN training so as to minimize • a score error which is a difference between a score when making inference using the generated refine image and the score maximized from the correct label score, and to minimize • an image difference value that is a difference between the generated refine image and the incorrect inference image (for example, an image difference (L1 difference), structural similarity (SIM), or a combination of the L1 difference and the structural similarity).

The image error calculating part 302 calculates a difference between the incorrect inference image and the refine image outputted from the image refiner part 301 during the training and inputs the image difference value to the image refiner part 301. The image error calculating part 302 calculates the image difference value from the difference for each pixel (L1 difference) or by performing structural similarity (SSIM) calculation, for example, and inputs the image difference value to the image refiner part 301.

The inferring part 303 includes the trained CNN that makes inference with the refine image generated by the image refiner part 301 or a synthesis image generated by the important superpixel determining part 322, to be discussed below, as an input, and that outputs a score of the inferred label. The synthesis image is nothing less than the incorrect inference image resulting from the replacement with the refine image of the region that is included in a map (important feature index map) generated by the map generating section 142 and that influences the inference of the correct label, of the incorrect inference images.

The score outputted by the inferring part 303 is notified to the score error calculating part 304 or the important superpixel evaluating part 323.

The score error calculating part 304 calculates an error between the score notified by the inferring part 303 and the score maximized from the correct label score and notifies the score error to the image refiner part 301. The score error notified by the score error calculating part 304 is used in the image refiner part 301 for training the CNN.

The refine image outputted from the image refiner part 301 during the training of the CNN included in the image refiner part 301 is stored in a refine image storing part 305. The training of the CNN included in the image refiner part 301 is performed, • for a predetermined number of training iterations (for example, the maximum number of training iterations=N times), or • until the correct label score exceeds a predetermined threshold, or • until the correct label score exceeds the predetermined threshold and the image difference value falls below the predetermined threshold. The refine image when the correct label score outputted from the inferring part 303 is maximized is hereinafter referred to as a "score-maximized refine image".

(2) Details of Map Generating Section

Next, the map generating section 142 is described in detail. As illustrated in FIG. 3, the map generating section 142 includes an important feature map generating part 311, a degradation scale map generating part 312, and a superimposing part 313.

The important feature map generating part 311 acquires, from the inferring part 303, inferring part structural information at the time of making inference with the score-maximized refine image as an input. The important feature map generating part 311 generates a "gray-scaled important feature map" based on the inferring part structural information using known algorithms. The examples of the known algorithms include, but are not limited to, the back propagation (BP) method, the guided back propagation (GBP) method, or a selective BP method. The gray-scaled important feature map is an example of a second map, and is a map gray-scaled to indicate a degree of attention of each of pixels that has drawn attention at the time of inference, of a plurality of pixels in the score-maximized refine image. It is noted that the size of the second map may be different from the size of the score-maximized refine image.

The BP method is a method that visualizes a feature portion by calculating an error of each label from a classification probability obtained by making inference of input data whose inferred label is correct (here, the score-maximized refine image) and imaging the magnitude of a gradient obtained by back-propagating to an input layer. The GBP method is a method that visualizes a feature portion by imaging only a positive value of gradient information as a feature portion.

The selective BP method is a method that maximizes only an error of a correct label and then performing processing using the BP method or the GBP method. In the case of the selective BP method, a feature portion to be visualized is a feature portion that affects only the correct label score.

The degradation scale map generating part 312 generates a "degradation scale map", which is an example of the first map, based on an incorrect inference image and a score-maximized refine image. The degradation scale map indicates a degree of change of each pixel that is changed when the score-maximized refine image is generated.

The superimposing part 313 generates an "important feature index map", which is an example of the third map, based on the gray-scaled important feature map generated by the important feature map generating part 311 and the degradation scale map generated by the degradation scale map generating part 312. The important feature index map indicates a degree of importance of each pixel for inferring a correct label. It is noted that the size of the second map may be different from the size of the first map (e.g., the degradation scale map).

(3) Details of Specifying Section

Next, the specifying section 143 is described in detail. As illustrated in FIG. 3, the specifying section 143 includes a superpixel segmenting part 321, an important superpixel determining part 322, and an important superpixel evaluating part 323.

The superpixel segmenting part 321 segments an incorrect inference image into "superpixels" and outputs superpixel segmentation information, the superpixels being a region in each component of an object (vehicle in the present embodiment) contained in the incorrect inference image. In segmenting the incorrect inference image into the superpixels, an existing segmentation function is utilized, or CNN and the like trained to segment for each component of the vehicle is utilized.

The important superpixel determining part 322 adds up a value of each pixel of the important feature index map generated by the superimposing part 313 for each superpixel, based on the superpixel segmentation information outputted by the superpixel segmenting part 321.

The important superpixel determining part 322 extracts superpixels, each having an added value of the added pixels that satisfies a predetermined condition (being larger than or equal to an important feature index threshold) among the superpixels. The important superpixel determining part 322 defines, as a changeable region (a region to be replaced by the score-maximized refine image), a superpixel group that is a combination of superpixels selected from the extracted superpixels. The important superpixel determining part 322 defines, as an unchangeable region (a region not to be replaced by the score-maximized refine image), a superpixel group other than the combined superpixel group.

The important superpixel determining part 322 extracts an image section corresponding to the unchangeable region from the incorrect inference image, extracts an image section corresponding to the changeable region from the refine image, and synthesizes these image sections to generate a synthesis image. The image refiner part 301 outputs a refine image that corresponds to the number of training iterations and that satisfies an output condition at the image refiner part 301. Consequently, the important superpixel determining part 322 generates a synthesis image for each of the corresponding number of refine images.

The important superpixel determining part 322 increases the number of superpixels to be extracted (widens the changeable region and narrows the unchangeable region) by gradually lowering the important feature index threshold used in defining the changeable region and the unchangeable region. The important superpixel determining part 322 updates the changeable region and the unchangeable region while changing the combination of the superpixels to be selected from the extracted superpixels.

The important superpixel evaluating part 323 acquires a correct label score to be inferred every time the synthesis image generated by the important superpixel determining part 322 is inputted to the inferring part 303. As described above, the important superpixel determining part 322 generates synthesis images the number of which corresponds to the number of refine images outputted by the image refiner part 301, the number of times of lowering the important feature index threshold, and the number of combinations of superpixels. Consequently, the important superpixel evaluating part 323 acquires the correct label scores corresponding to the above number. The important superpixel evaluating part 323 specifies a combination of superpixels (changeable region) that causes incorrect inference based on the acquired scores, and outputs the specified combination as the incorrect inference cause information.

At this time, the important superpixel evaluating part 323 specifies the changeable region so that an area is as small as possible. For example, when evaluating the scores acquired from the inferring part 303, the important superpixel evaluating part 323 preferentially evaluates a superpixel having a small area in ascending order, of superpixels before the important feature index threshold is lowered or combinations of superpixels. The important superpixel evaluating part 323 specifies a changeable region (a changeable region that is extracted with the important feature index threshold at a limit capable of inferring a correct label and has the smallest area) at which time the correct label is inferred as the important feature index threshold is lowered.

<Specific Example of Processing of Components of Incorrect Inference Cause Extracting Unit>

Next, a specific example of processing of the components of the incorrect inference cause extracting unit 140 is described.

(1) Specific Example of Processing of Refine Image Generating Section

Figure 4:
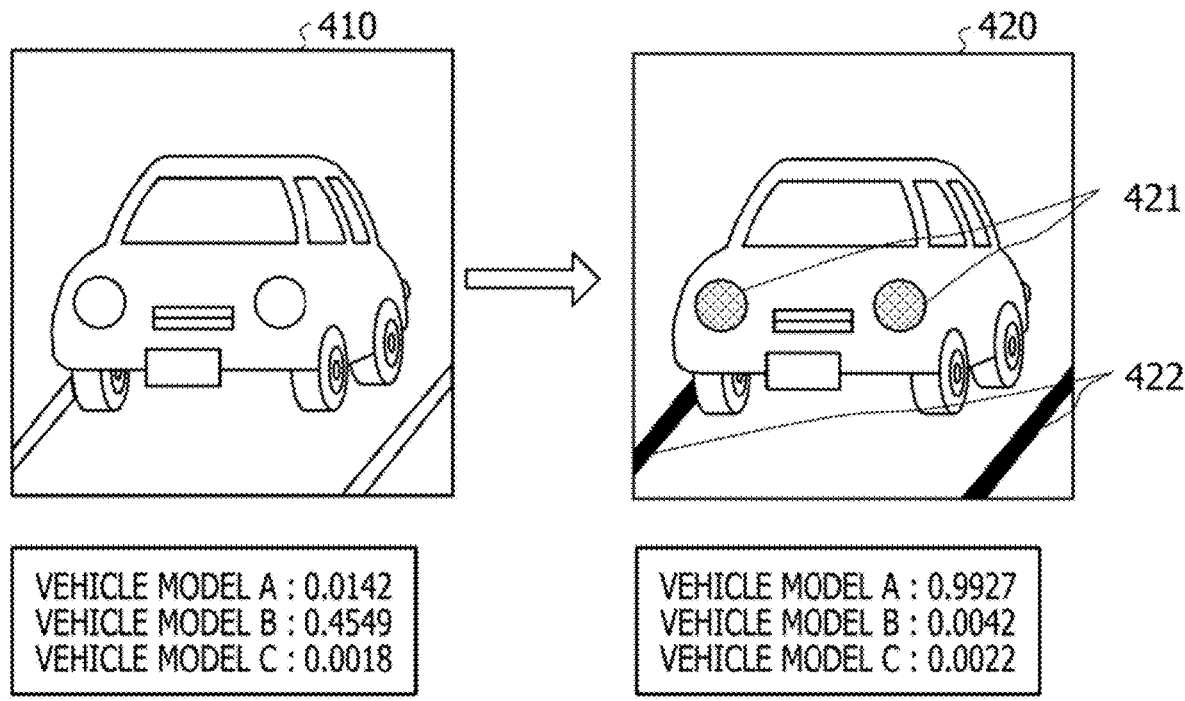
FIG. 4 illustrates a specific example of processing of a refine image generating section.

First, a specific example of processing of the refine image generating section 141 is described. FIG. 4 illustrates a specific example of the processing of the refine image generating section. The example on the left side of FIG. 4 illustrates a case where as a result of making inference with an incorrect inference image 410 containing a vehicle having a correct label="vehicle model A" as an input, the label was incorrectly inferred as "vehicle model B".

The example on the left side of FIG. 4 illustrates that the scores in the case of making inference with the incorrect inference image 410 as the input were • the score of the vehicle model A=0.0142, • the score of the vehicle model B=0.4549, and • the score of a vehicle model C=0.0018.

On the other hand, the example on the right side of FIG. 4 illustrates a case where the refine image generating section 141 has performed a process of generating a refine image from the incorrect inference image 410 to generate a score-maximized refine image 420. The example on the right side of FIG. 4 illustrates that the refine image generating section 141 has generated the score-maximized refine image 420 by changing colors of headlights 421 and a color of a road sign 422 with respect to the incorrect inference image 410.

The example on the right side of FIG. 4 illustrates that making inference with the score-maximized refine image 420 as an input has made it possible to infer a label that matches the correct label="vehicle model A". The example on the right side of FIG. 4 illustrates that the scores when making inference with the score-maximized refine image 420 as the input were • the score of the vehicle model A=0.9927, • the score of the vehicle model B=0.0042, and • the score of the vehicle model C=0.0022.

In this manner, by changing the incorrect inference image 410, the refine image generating section 141 makes it possible to generate the score-maximized refine image 420 that allows for inference of a label matching the correct label and that has the maximized correct label score.

As illustrated in the example on the right side of FIG. 4, in the case of the score-maximized refine image 420 generated by the refine image generating section 141, there is a possibility that even the road sign irrelevant to the vehicle may also be changed, with respect to the incorrect inference image 410. This is because although error back propagation in the training to maximize the correct label score affects a route (unit) for the CNN which affects the correct label score, the affected route (unit) is not exactly related to a cause of the incorrect inference.

For example, when an attempt is made to specify an image section that causes incorrect inference based on a changed portion as with the existing activation maximization method, there is a problem that it is difficult to specify the image section with adequate precision (further narrowing is desired for the changed portion). In the incorrect inference cause extracting unit 140 according to the embodiment, the map generating section 142 and the specifying section 143 function, and the further narrowing is performed.

Figure 5:
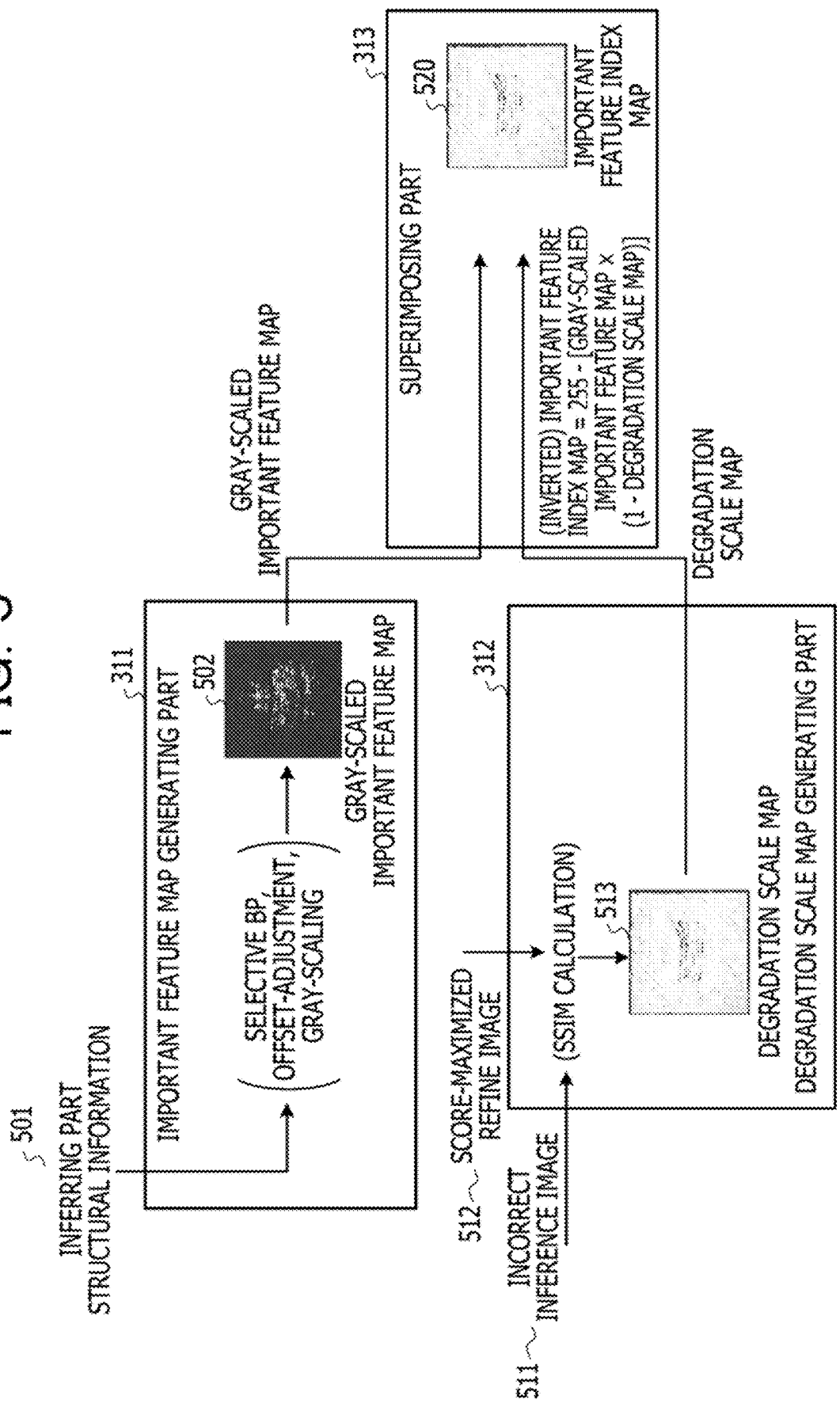
FIG. 5 illustrates a specific example of processing of a map generating section.

(2) Specific Example of Processing of Map Generating Section (2-1) Specific Example of Processing of Map Generating Section Next, a specific example of processing of the map generating section 142 is described. First, a specific example of overall processing of the map generating section 142 is described. FIG. 5 illustrates a specific example of the processing of the map generating section.

As illustrated in FIG. 5, in the map generating section 142, the important feature map generating part 311 acquires, from the inferring part 303, inferring part structural information 501 at the time when the inferring part 303 makes inference with the score-maximized refine image as an input. The important feature map generating part 311 generates an important feature map by using, for example, the selective BP method, based on the acquired inferring part structural information 501, and performs the offset-adjustment on the generated important feature map. The processing by the important feature map generating part 311 is described below in detail.

The important feature map generating part 311 gray-scales an important feature map which performed the offset-adjustment to generate a gray-scaled important feature map 502.

The gray-scaled important feature map 502 illustrated in FIG. 5 is gray-scaled with pixel values of 0 to 255. Hence, in the gray-scaled important feature map 502, pixels having pixel values close to 255 are pixels that draw attention (attention drawing pixels) at the time of inference, and pixels having pixel values close to 0 are pixels that do not draw attention (non-attention drawing pixels) at the time of inference.

On the other hand, the degradation scale map generating part 312 reads a score-maximized refine image 512 from the refine image storing part 305 and performs structural similarity (SSIM) calculation between the score-maximized refine image 512 and an incorrect inference image 511. As such, the degradation scale map generating part 312 generates a degradation scale map 513. The degradation scale map 513 takes values from 0 to 1, and indicates that the closer to 1 the pixel value is, the smaller the difference between the images is, while the closer to 0 the pixel value is, the larger the difference between the images is.

The superimposing part 313 uses the gray-scaled important feature map 502 generated by the important feature map generating part 311 and the degradation scale map 513 generated by the degradation scale map generating part 312, and generates important feature index map 520.

For example, the superimposing part 313 generates the important feature index map 520 based on the following equation:

$$\text{Important feature index map} = \text{gray-scaled important feature map} \times (1 - \text{degradation scale map}) \quad \text{(Equation 1)}$$

In the above equation, the term (1-degradation scale map) takes a value from 0 to 1. The closer to 1 the value is, the larger the difference between the images is, while the closer to 0 the value is, the smaller the difference between the images is. Therefore, the important feature index map 520 is an image obtained by adding intensity of the difference between the images to a gray-scaled important feature map, which indicates the degree of attention of a pixel that draws attention at the time of inference, of the plurality of pixels of the score-maximized refine image.

For example, the important feature index map 520 is generated by • reducing the pixel values of the gray-scaled important feature map in a portion where the difference between the images is small in the degradation scale map 513 and • increasing the pixel values of the gray-scaled important feature map in a portion where the difference between the images is large in the degradation scale map 513.

For more easily recognizable visualization, the important feature index map may be inverted. The important feature index map illustrated in FIG. 5 is an important feature index map that is inverted based on the following equation:

$$\text{(Inverted) important feature index map} = 255 - [\text{gray-scaled important feature map} \times (1 - \text{degradation scale map})] \quad \text{(Equation 2)}$$

The advantages of the superimposing part 313 superimposing the gray-scaled important feature map 502 and the degradation scale map 513 based on the above equation are described.

The gray-scaled important feature map 502 generated by the important feature map generating part 311 is nothing less than an attention portion that is calculated by the inferring part 303 when making inference with the score-maximized refine image as an input and when the correct label score is maximized.

On the other hand, the degradation scale map 513 generated by the degradation scale map generating part 312 represents a changed portion when an incorrect inference image is changed such that the correct label score is maximized and represents a region that causes incorrect inference. Nevertheless, the degradation scale map 513 generated by the degradation scale map generating part 312 is not a minimum region desirable for maximizing the correct label score.

The superimposing part 313 superimposes the changed portion when the incorrect inference image is changed such that the correct label score is maximized and the attention portion calculated by the inferring part 303 to narrow the region desirable for maximizing the correct label score. This makes it possible to narrow the region that causes incorrect inference.

(2-2) Specific Example of Processing of Important Feature Map Generating Part

Figure 6:
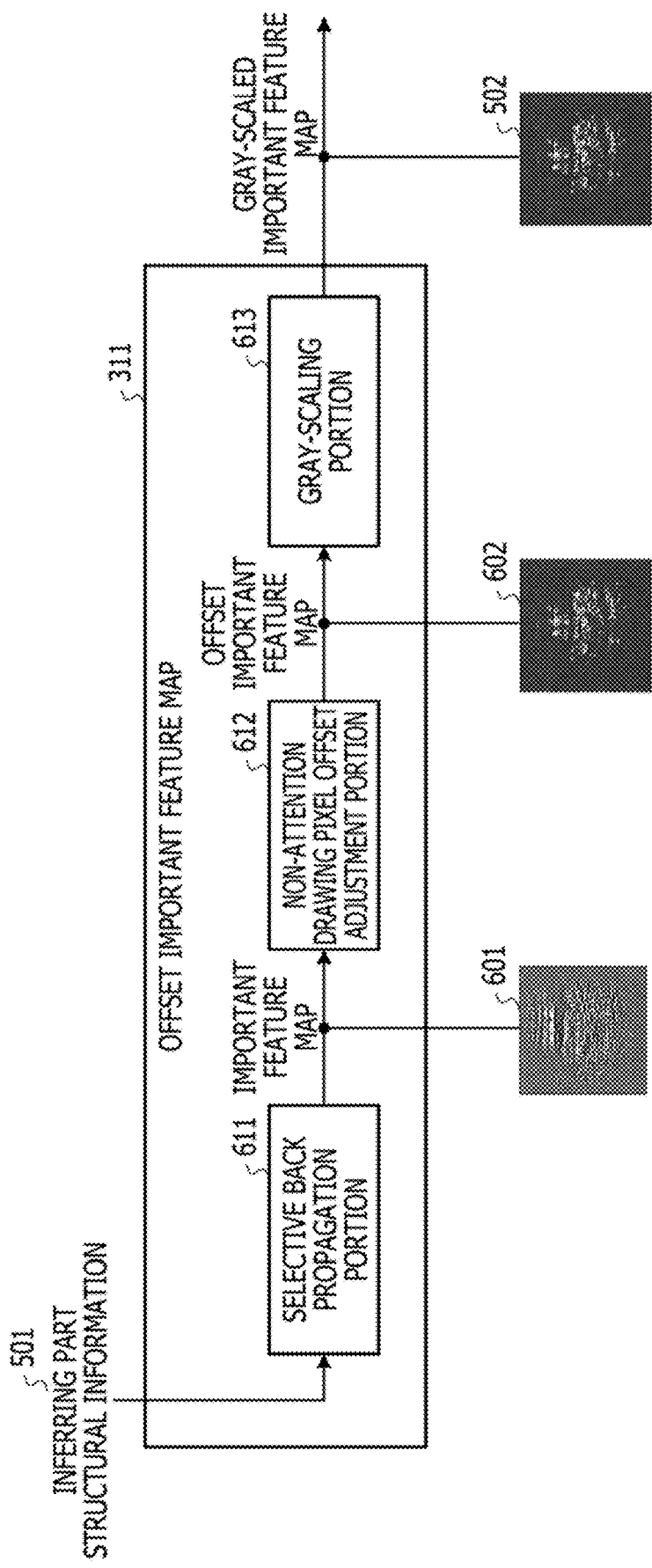
FIG. 6 illustrates details of a functional configuration of an important feature map generating part.
Figure 7:
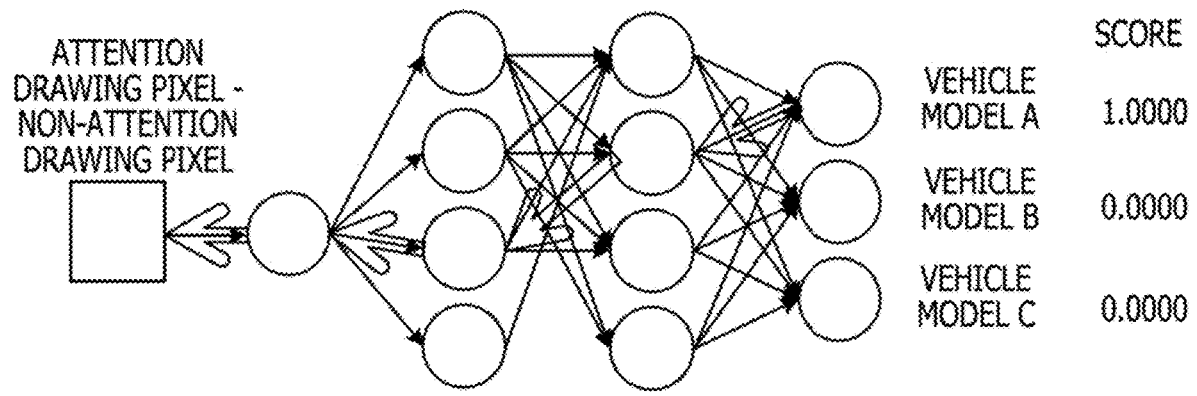
FIG. 7 illustrates a specific example of processing of a selective back propagation portion.

Next, using FIG. 6, the important feature map generating part 311 of the map generating section 142 is further described in detail with reference to FIGS. 7 to 9. FIG. 6 illustrates details of the functional configuration of the important feature map generating part.

As illustrated in FIG. 6, the important feature map generating part 311 includes a selective back propagation portion 611, a non-attention drawing pixel offset adjustment portion 612, and a gray-scaling portion 613.

The selective back propagation portion 611 is an example of a generating section. The selective back propagation portion 611 acquires the inferring part structural information 501 from the inferring part 303 and generates an important feature map 601 using the selective BP method. FIG. 7 illustrates a specific example of processing of the selective back propagation portion. As illustrated in FIG. 7, the selective back propagation portion 611 performs selective back propagation under the constraint that an error of inference is not zero for a correct label inferred by the inferring part 303. As such, the selective back propagation portion 611 generates the important feature map 601. In generation of the important feature map 601, an output from the selective back propagation portion 611 may be directly used or an absolute value taken may be used.

The non-attention drawing pixel offset adjustment portion 612 is an example of an adjusting portion and performs the offset-adjustment in the generated important feature map 601 so that a pixel value of the non-attention drawing pixel is zero. The important feature map 601 generated by the selective back propagation portion 611 may be calculated with the pixel value of the non-attention drawing pixel as zero or may be calculated with the pixel value of the non-attention drawing pixel as non-zero (which varies depending on the type of the CNN used by the inferring part 303).

The non-attention drawing pixel offset adjustment portion 612 performs the offset-adjustment so that the pixel value of the non-attention drawing pixel contained in the important feature map 601 is zero. The non-attention drawing pixel offset adjustment portion 612 performs the offset-adjustment with a pixel as the non-attention drawing pixel, the pixel having the pixel value with the maximum appearance frequency among pixels included in the important feature map 601.

Figure 8:
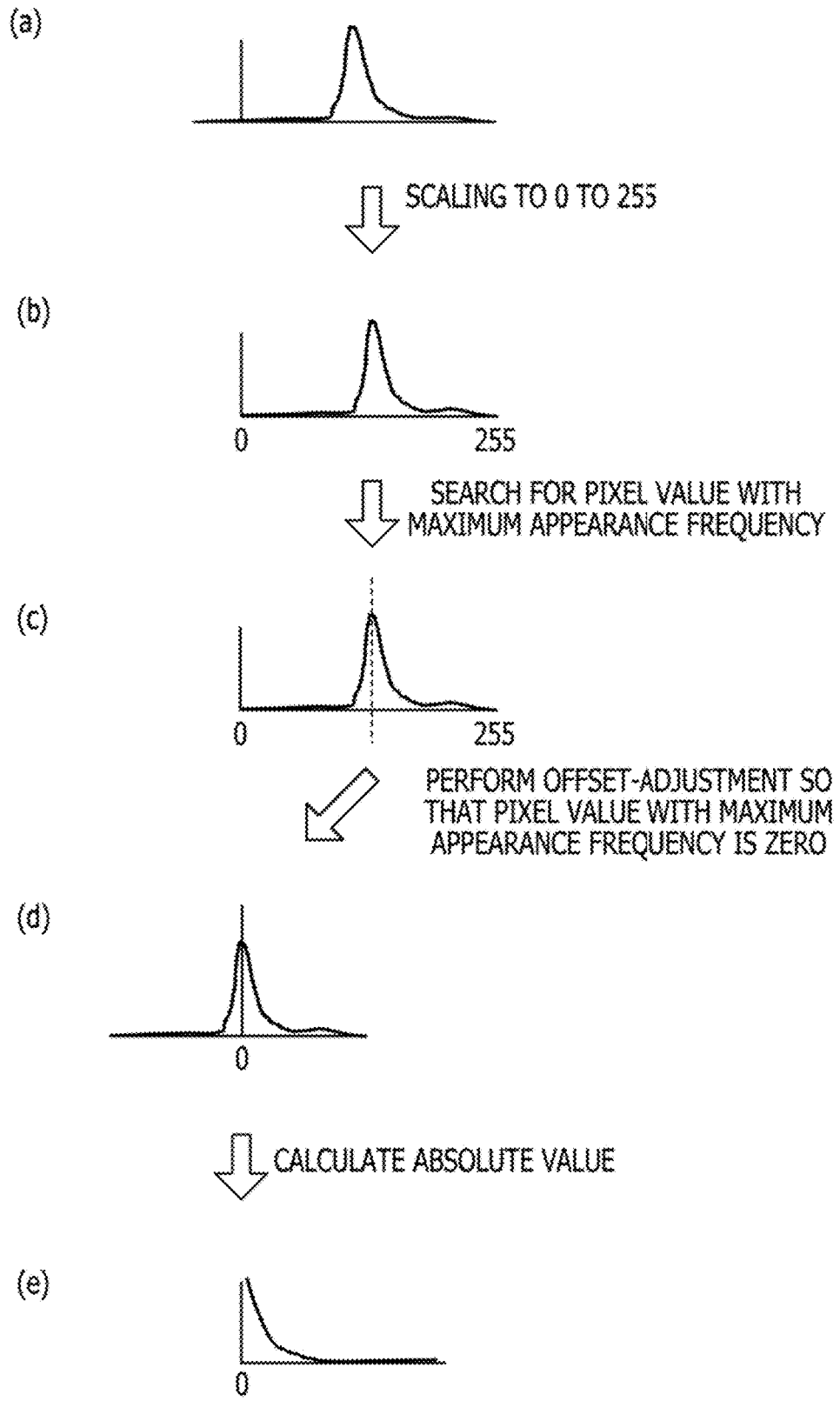
FIG. 8 illustrates contents of processing of a non-attention drawing pixel offset adjustment portion.

FIG. 8 illustrates contents of processing of the non-attention drawing pixel offset adjustment portion. As illustrated in FIG. 8(*a*), when acquiring the important feature map 601 from the selective back propagation portion 611, the non-attention drawing pixel offset adjustment portion 612 generates a histogram that indicates the appearance frequency of each pixel value. Subsequently, the non-attention drawing pixel offset adjustment portion 612 performs a scaling process so that the minimum value is "0" and a maximum value is "255" (FIG. 8(*b*)). When visualization or application is performed that maintains a signal output of the selective back propagation portion 611, a method without performing the scaling process may be used. Unless otherwise specified, scaling is performed in the following description.

Subsequently, when using an absolute value of an output of the selective back propagation portion 611, the non-attention drawing pixel offset adjustment portion 612 searches for a pixel value with the maximum appearance frequency (FIG. 8(*c*)) and performs the offset-adjustment so that the pixel value with the maximum appearance frequency is zero (FIG. 8(*d*)).

Subsequently, the non-attention drawing pixel offset adjustment portion 612 calculates then absolute value of the pixel value (FIG. 8(*e*)). As such, the non-attention drawing pixel offset adjustment portion 612 generates an offset important feature map 602 (See FIG. 6).

Figure 9A:
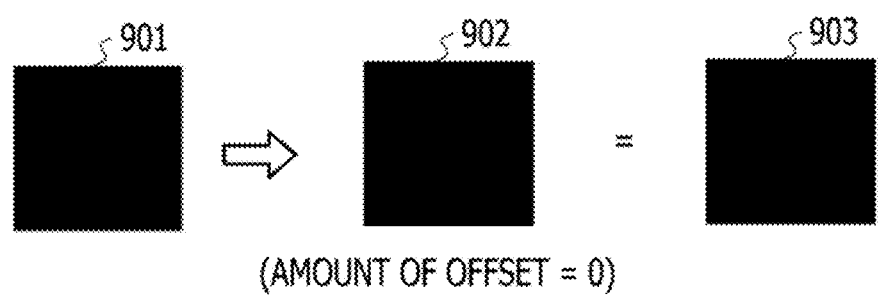
FIGS. 9A and 9B illustrate specific examples of the processing of the non-attention drawing pixel offset adjustment portion.
Figure 9B:
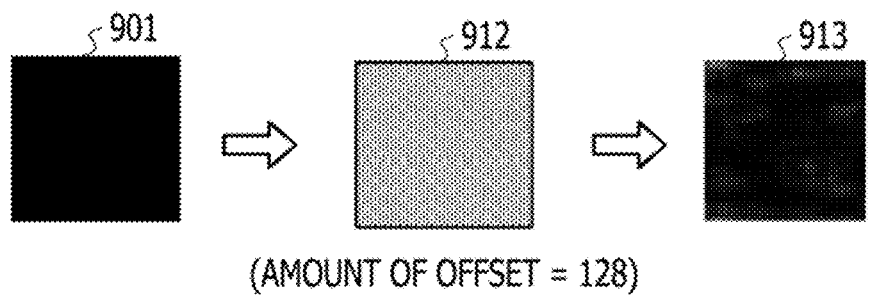

FIGS. 9A and 9B illustrate specific examples of processing of the non-attention drawing pixel offset adjustment portion. FIG. 9A illustrates a case where in an important feature map generated by the selective back propagation portion 611, the pixel value of the non-attention drawing pixel is calculated as zero. In contrast, FIG. 9B illustrates a case where in the important feature map generated by the selective back propagation portion 611, the pixel value of the non-attention drawing pixel is calculated as non-zero. The non-attention drawing pixel is offset adjusted for the following reason: When information is filtered or signal intensity is adjusted, based on the degree of attention, as described above, it is possible to process information into an intended form by having the information, which is adjusted to the signal intensity according to the degree of attention, to work. For use in known visualization, it is possible to read that a section which does not draw attention is implicitly some pixel value. However, when the section is processed by a computer, the computer does not treat the section implicitly. Thus, the offset-adjustment as described above is desirable.

The type of the CNN used by the inferring part 303 dictates which case of the processing as described above is performed. Therefore, it is possible to calculate an amount of offset in each case based on, for example, an image including uniform pixel values (image having no feature (for example, an image including non-attention drawing pixels) such as an image 901 illustrated in FIGS. 9A and 9B). For example, it is possible to calculate the amount of offset by acquiring the inferring part structural information 501 at the time of inputting the image 901 to each inferring part 303 in which a different type of the CNN is used and by generating an important feature map, using the selective BP method.

FIG. 9A is a case where the amount of offset is "0". In this case, the non-attention drawing pixel offset adjustment portion 612 does not perform the offset-adjustment (important feature map denoted by the numeral 902=offset important feature map). In contrast, FIG. 9B is a case where the amount of offset is "128". In this case, the non-attention drawing pixel offset adjustment portion 612 performs the offset-adjustment (important feature map denoted by the numeral 912→offset important feature map denoted by the numeral 913).

Return to the description of FIG. 6. The gray-scaling portion 613 performs a gray-scaling process on the offset important feature map 602 that is performed offset-adjustment by the non-attention drawing pixel offset adjustment portion 612, and generates the gray-scaled important feature map 502. For example, when the offset important feature map 602 is colored, the gray-scaling portion 613 performs the gray-scaling process and generates the gray-scaled important feature map 502. The gray-scaled important feature map 502 may be generated for each channel by separating respective RGB channels and treating an individual channel as gray-scale. However, when the offset important feature map 602 is not colored, the gray-scaling portion 613 does not perform the gray-scaling process.

(3) Specific Example of Processing of Specifying Section

Next, a specific example of processing of the components of the specifying section 143 (the superpixel segmenting part 321, the important superpixel determining part 322, and the important superpixel evaluating part 323) is described.

(3-1) Specific Example of Processing of Superpixel Segmenting Part

Figure 10:
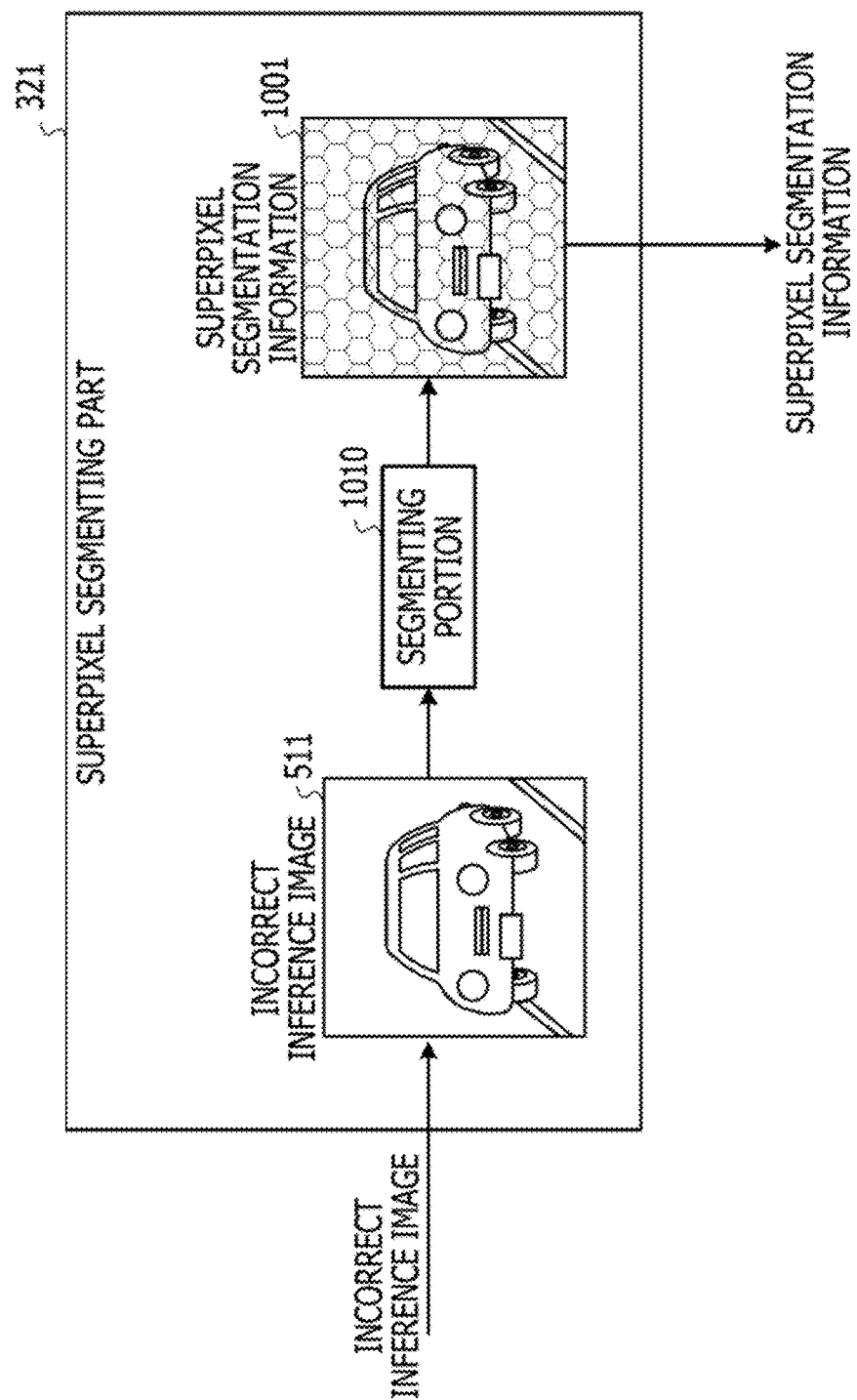
FIG. 10 illustrates a specific example of processing of superpixel segmenting part.

First, a specific example of processing of the superpixel segmenting part 321 included in the specifying section 143 is described. FIG. 10 illustrates the specific example of the processing of the superpixel segmenting part. As illustrated in FIG. 10, the superpixel segmenting part 321 includes a segmenting portion 1010 that performs a simple linear iterative clustering (SLIC) process, for example. The segmenting portion 1010 segments the incorrect inference image 511 into superpixels which are partial images of each component of the vehicle contained in the incorrect inference image 511. The superpixel segmenting part 321 outputs superpixel segmentation information 1001 generated by the segmentation into the superpixels by the segmenting portion 1010.

(3-2) Specific Example of Processing of Important Superpixel Determining Part

Figure 11:
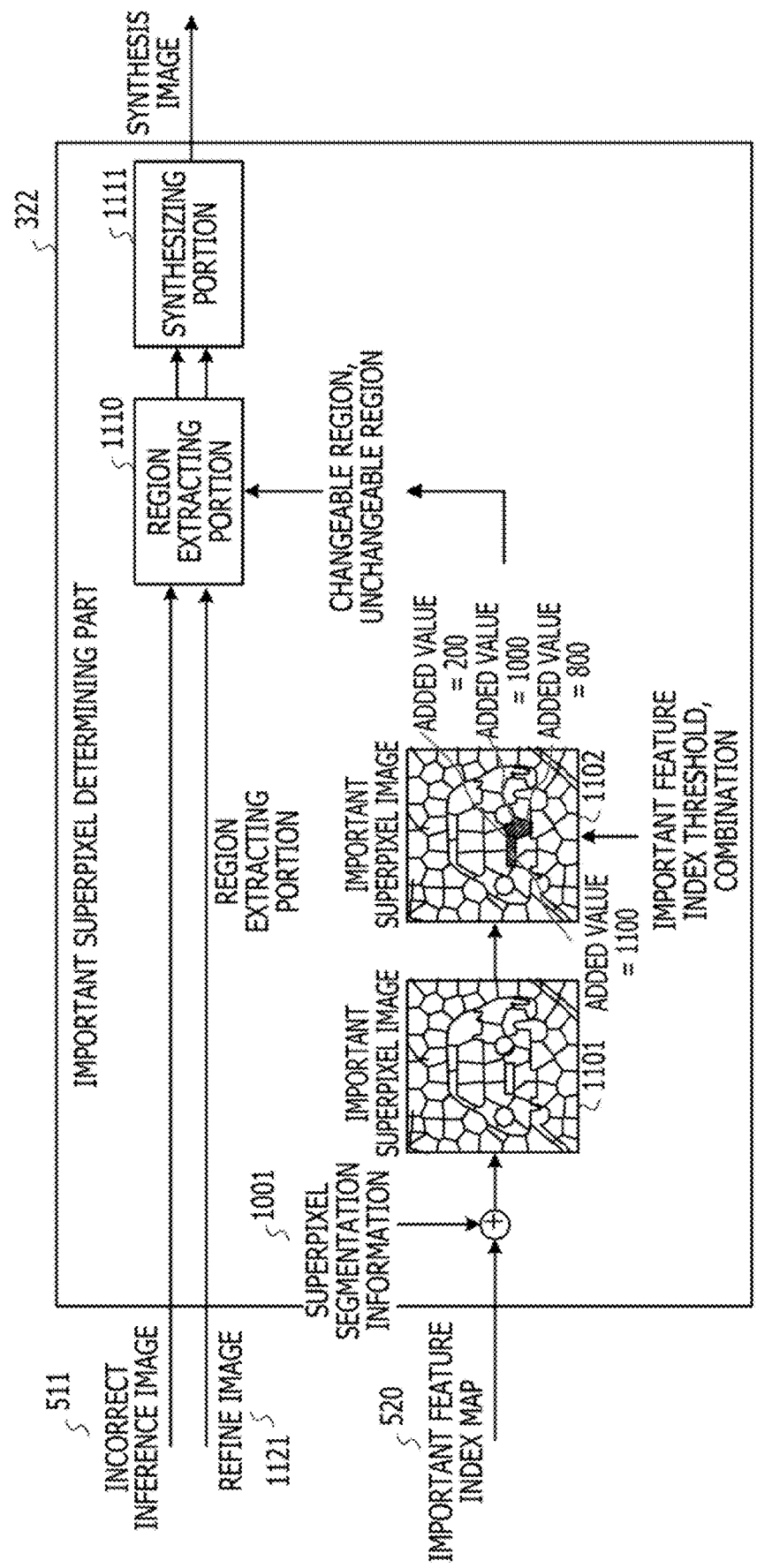
FIG. 11 illustrates a specific example of processing of an important superpixel determining part.

Next, a specific example of processing of the important superpixel determining part 322 included in the specifying section 143 is described. FIG. 11 illustrates the specific example of the processing of the important superpixel determining part.

As illustrated in FIG. 11, the important superpixel determining part 322 includes a region extracting portion 1110 and a synthesizing portion 1111.

The important superpixel determining part 322 superimposes the important feature index map 520 outputted from the superimposing part 313 and the superpixel segmentation information 1001 outputted from the superpixel segmenting part 321. As such, the important superpixel determining part 322 generates an important superpixel image 1101. FIG. 11 depicts an (inverted) important feature index map as the important feature index map 520.

The important superpixel determining part 322 adds up a value of each pixel of the important feature index map 520 for each superpixel in the generated important superpixel image 1101.

The important superpixel determining part 322 determines whether the added value for each superpixel is larger than or equal to the important feature index threshold, and extracts superpixels for which the added value is determined to be larger than or equal to the important feature index threshold. In FIG. 11, an important superpixel image 1102 clearly illustrates an example of the added value for each superpixel.

The important superpixel determining part 322 combines the superpixels selected from the extracted superpixels, and defines the combined superpixels as the changeable region and defines superpixels other than the combined superpixels as the unchangeable region. The important superpixel determining part 322 notifies the region extracting portion 1110 of the defined changeable region and unchangeable region.

The region extracting portion 1110 extracts an image section corresponding to the unchangeable region from the incorrect inference image 511 and extracts an image section corresponding to the changeable region from a refine image 1121.

The synthesizing portion 1111 synthesizes the image section corresponding to the changeable region extracted from the refine image 1121, and the image section corresponding to the unchangeable region extracted from the incorrect inference image 511 and generates a synthesis image.

Figure 12:
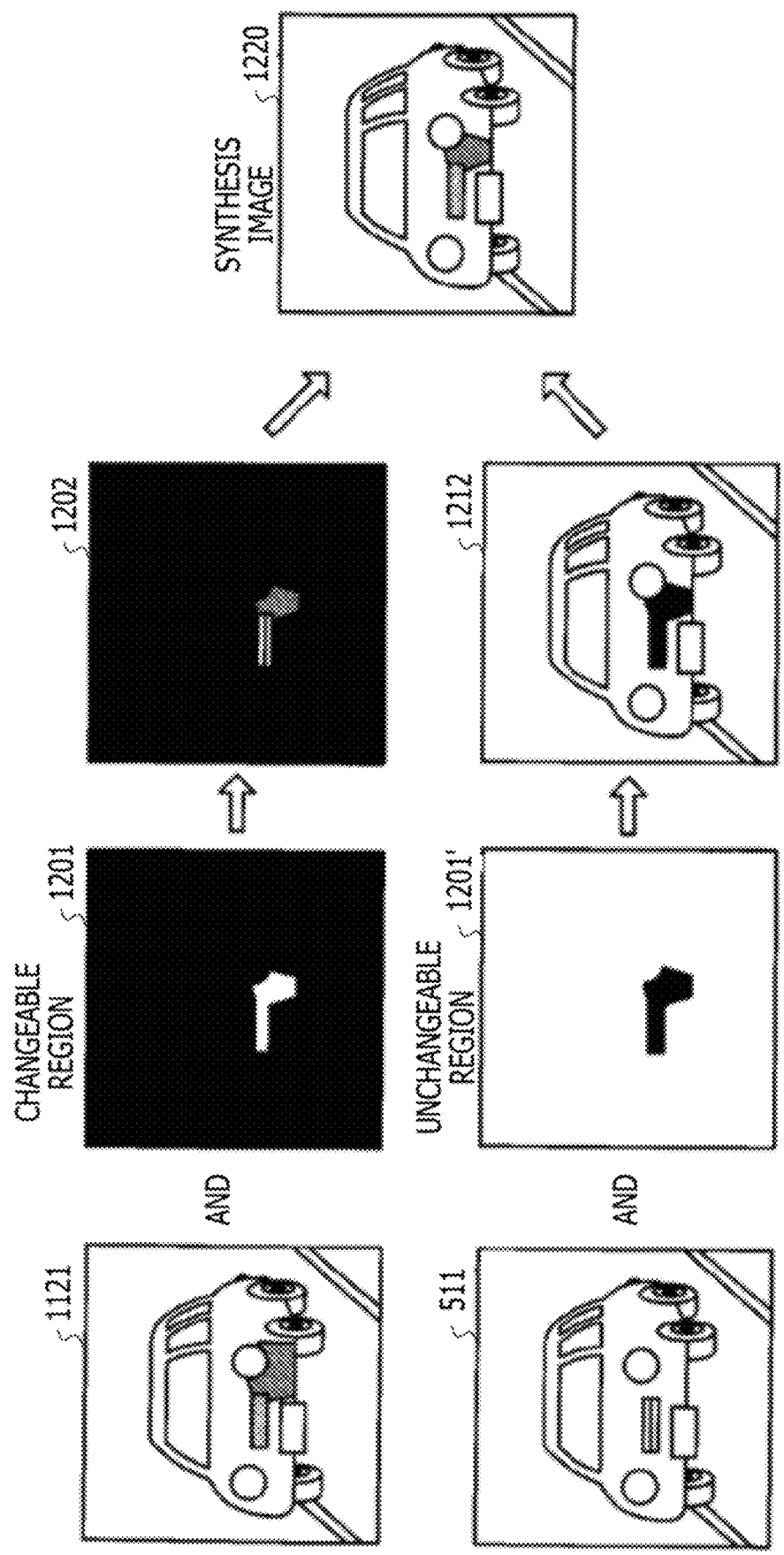
FIG. 12 illustrates a specific example of processing of a region extracting portion and a synthesizing portion.

FIG. 12 illustrates a specific example of processing of the region extracting portion and the synthesizing portion. In FIG. 12, the upper column illustrates a case where the region extracting portion 1110 extracts an image section (a white portion in the image 1201) corresponding to the changeable region from the refine image 1121.

On the other hand, in FIG. 12, the lower column illustrates a case where the region extracting portion 1110 extracts an image section (a white portion in the image 1201') corresponding to the unchangeable region from the incorrect inference image 511. The image 1201' is an image obtained by inverting the white portion and the black portion of the image 1201 (for the sake of explanation, in the lower column of FIG. 12, the white portion is an image section corresponding to the unchangeable region).

As illustrated in FIG. 12, the synthesizing portion 1111 synthesizes the image section corresponding to the changeable region in the refine image 1121 and the image section corresponding to the unchangeable region in the incorrect inference image 511, which are outputted from the region extracting portion 1110, and generates a synthesis image 1220.

In this manner, the specifying section 143 makes it possible to specify an region to be replaced with the refine image 1121 in the unit of a superpixel, by using the important feature index map 520 when generating the synthesis image 1220.

<Flow of Incorrect Inference Cause Extracting Process>

Figure 13:
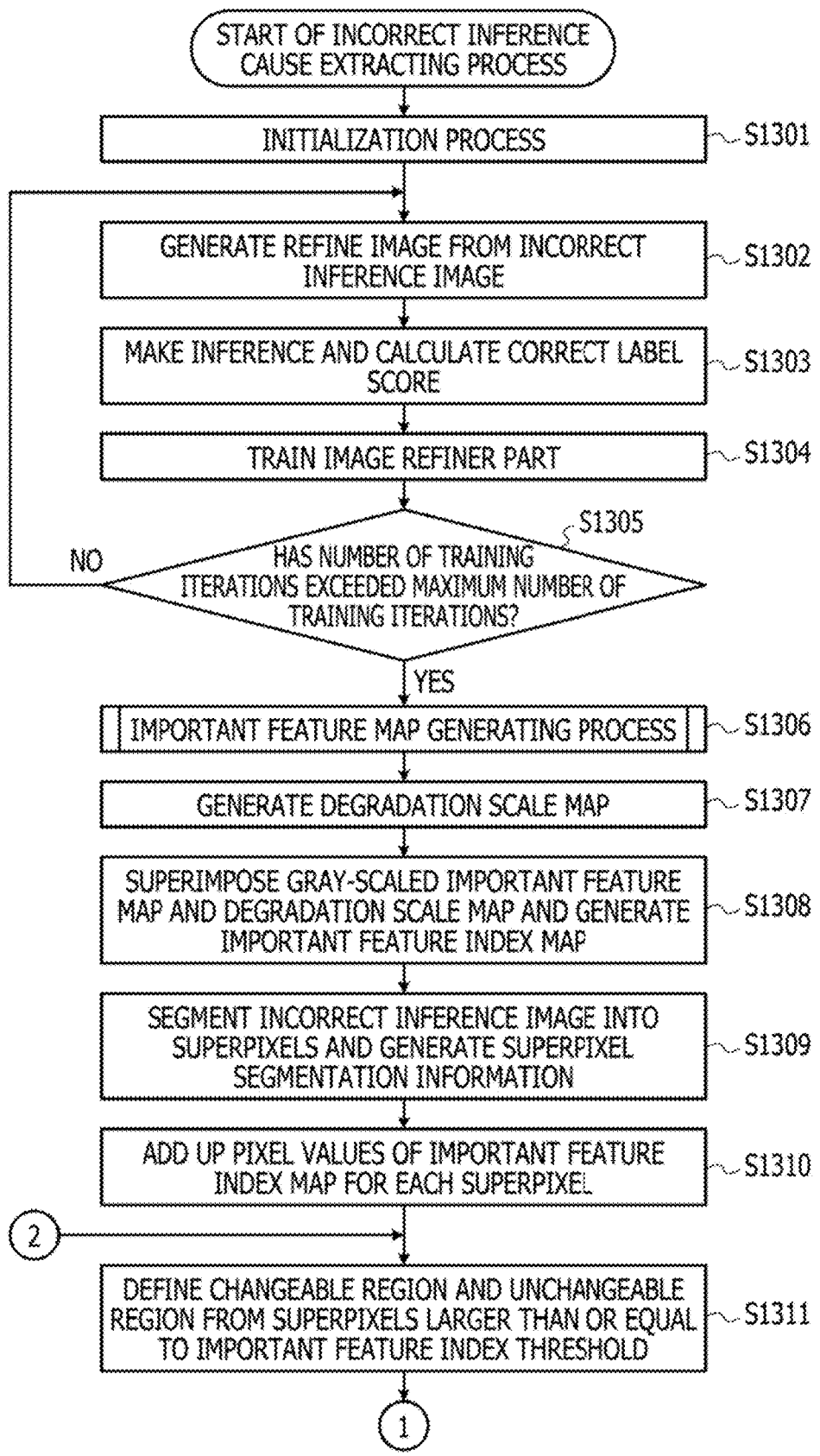
FIG. 13 is a first flowchart illustrating flow of an incorrect inference cause extracting process.
Figure 14:
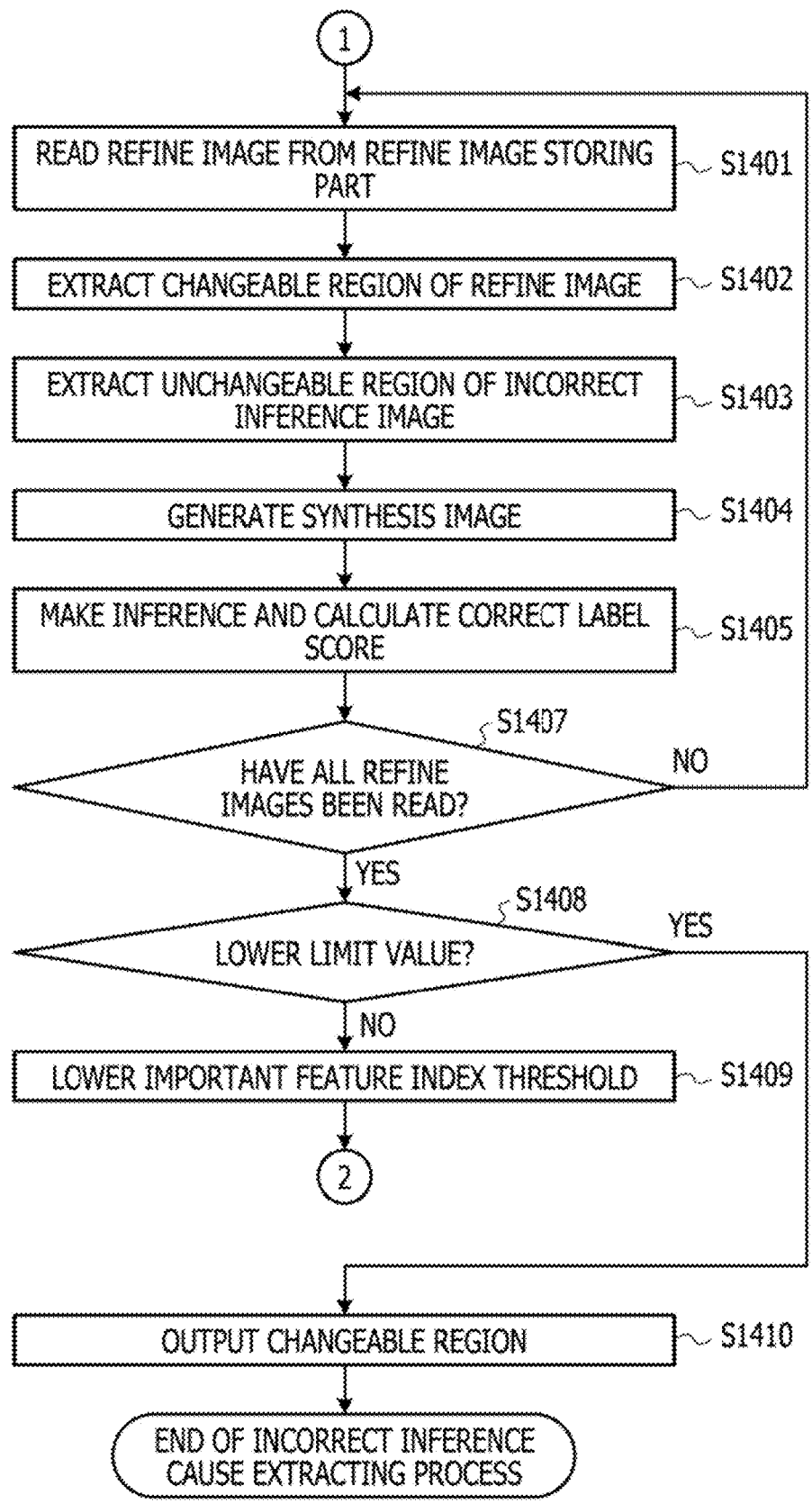
FIG. 14 is a second flowchart illustrating the flow of the incorrect inference cause extracting process.

Next, flow of an incorrect inference cause extracting process performed by the incorrect inference cause extracting unit 140 is described. FIGS. 13 and 14 are first and second flowcharts illustrating the flow of the incorrect inference cause extracting process.

In step S1301, the components of the incorrect inference cause extracting unit 140 performs an initialization process. For example, the image refiner part 301 sets the number of training iterations for the CNN to zero and sets the maximum number of training iterations to a value instructed by the user. The image refiner part 301 sets the important feature index threshold and a lower limit value thereof to values instructed by the user.

In step S1302, the image refiner part 301 changes the incorrect inference image to generate a refine image.

In step S1303, the inferring part 303 makes inference with the refine image as an input and calculates the correct label score.

In step S1304, the image refiner part 301 conducts the CNN training using an image difference value and a score error.

In step S1305, the image refiner part 301 determines whether the number of training iterations exceeds the maximum number of training iterations. In step S1305, when the image refiner part 301 determines that the number of training iterations does not exceed the maximum number of training iterations (No in step S1305), the process returns to step S1302 and the generation of the refine image continues.

On the other hand, in step S1305, when the image refiner part 301 determines that the number of training iterations exceeds the maximum number of training iterations (Yes in step S1305), the process proceeds to step S1306. At this time, the refine image (including the score-maximized refine image) generated in each training iteration is stored in the refine image storing part 305.

In step S1306, the important feature map generating part 311 acquires the inferring part structural information when the inferring part 303 makes inference with the score-maximized refine image as the input, and generates the gray-scaled important feature map based on the acquired inferring part structural information (details of which are described below).

In step S1307, the degradation scale map generating part 312 generates a degradation scale map based on the incorrect inference image and the score-maximized refine image.

In step S1308, the superimposing part 313 generates an important feature index map based on the gray-scaled important feature map and the degradation scale map.

In step S1309, the superpixel segmenting part 321 segments the incorrect inference image into superpixels and generates the superpixel segmentation information.

In step S1310, the important superpixel determining part 322 adds up a value of each pixel in the important feature index map in the unit of a superpixel.

In step S1311, the important superpixel determining part 322 extracts superpixels whose added values are larger than or equal to the important feature index threshold, and combines the superpixels selected from the extracted superpixels to define a changeable region. The important superpixel determining part 322 defines the superpixels other than the combined superpixels as an unchangeable region.

Subsequently, in step S1401 in FIG. 14, the important superpixel determining part 322 reads a refine image from the refine image storing part 305.

In step S1402, the important superpixel determining part 322 extracts an image section corresponding to the changeable region from the refine image.

In step S1403, the important superpixel determining part 322 extracts an image section corresponding to the unchangeable region from the incorrect inference image.

In step S1404, the important superpixel determining part 322 synthesizes the image section corresponding to the changeable region extracted from the refine image and the image section corresponding to the unchangeable region extracted from the incorrect inference image, and generates a synthesis image.

In step S1405, the inferring part 303 makes inference with the synthesis image as an input and calculates a correct label score. The important superpixel evaluating part 323 acquires the correct label score calculated by the inferring part 303.

In step S1407, the image refiner part 301 determines whether all the refine images stored in the refine image storing part 305 have been read. In step S1407, when the image refiner part 301 determines that there is a refine image that has not been read yet (No in step S1407), the process returns to step S1401.

On the other hand, in step S1407, when the image refiner part 301 determines that all the refine images have been read (Yes in step S1407), the process proceeds to step S1408.

In step S1408, the important superpixel determining part 322 determines whether the important feature index threshold has reached the lower limit value. In step S1408, when the important superpixel determining part 322 determines that the important feature index threshold has not reached the lower limit value yet (No in step S1408), the process proceeds to step S1409.

In step S1409, the important superpixel determining part 322 lowers the important feature index threshold. Then, the process returns to step S1311 in FIG. 13.

On the other hand, in step S1408, when the important superpixel determining part 322 determines that the important feature index threshold has reached the lower limit value (Yes in step S1408), the process proceeds to step S1410.

In step S1410, the important superpixel evaluating part 323 specifies a combination of superpixels (changeable region) that causes incorrect inference based on the acquired correct label score, and outputs the specified combination as the incorrect inference cause information.

<Flow of Processing of Important Feature Map Generating Process>

Figure 15:
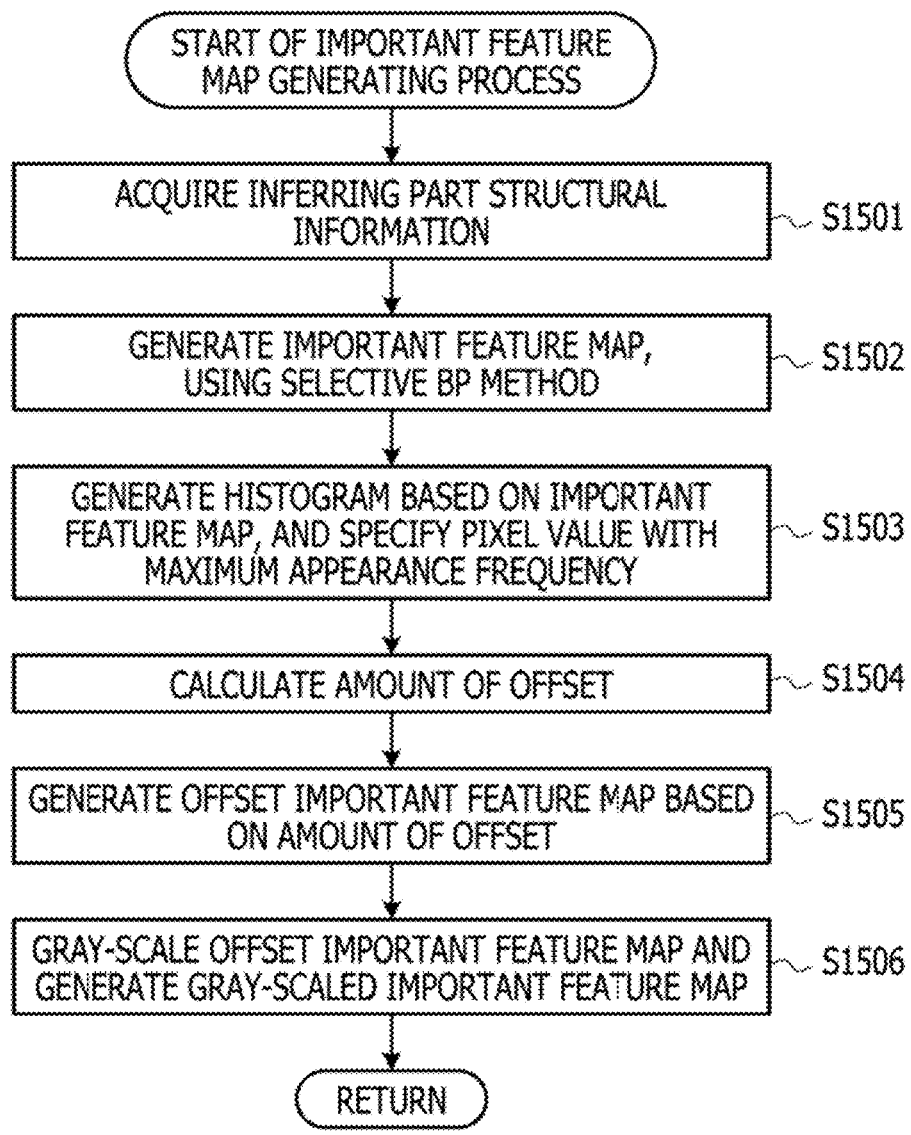
FIG. 15 is a flowchart illustrating flow of an important feature map generating process.

Next, an important feature map generating process in step S1306 in FIG. 13 is described in detail. FIG. 15 is a flowchart illustrating flow of the important feature map generating process.

In step S1501, the selective back propagation portion 611 acquires the inferring part structural information from the inferring part 303.

In step S1502, the selective back propagation portion 611 generates an important feature map for the inferring part structural information, using the selective BP method.

In step S1503, the non-attention drawing pixel offset adjustment portion 612 generates a histogram based on the important feature map and specifies a pixel value with the maximum appearance frequency.

In step S1504, the non-attention drawing pixel offset adjustment portion 612 calculates the amount of offset based on the pixel value with the maximum appearance frequency.

In step S1505, the non-attention drawing pixel offset adjustment portion 612 performs the offset-adjustment of the important feature map based on the calculated amount of offset, and generates an offset important feature map.

In step S1506, the gray-scaling portion 613 performs the gray-scaling process on the offset important feature map and generates a gray-scaled important feature map.

<Specific Example of Incorrect Inference Cause Extracting Process>

Figure 16:
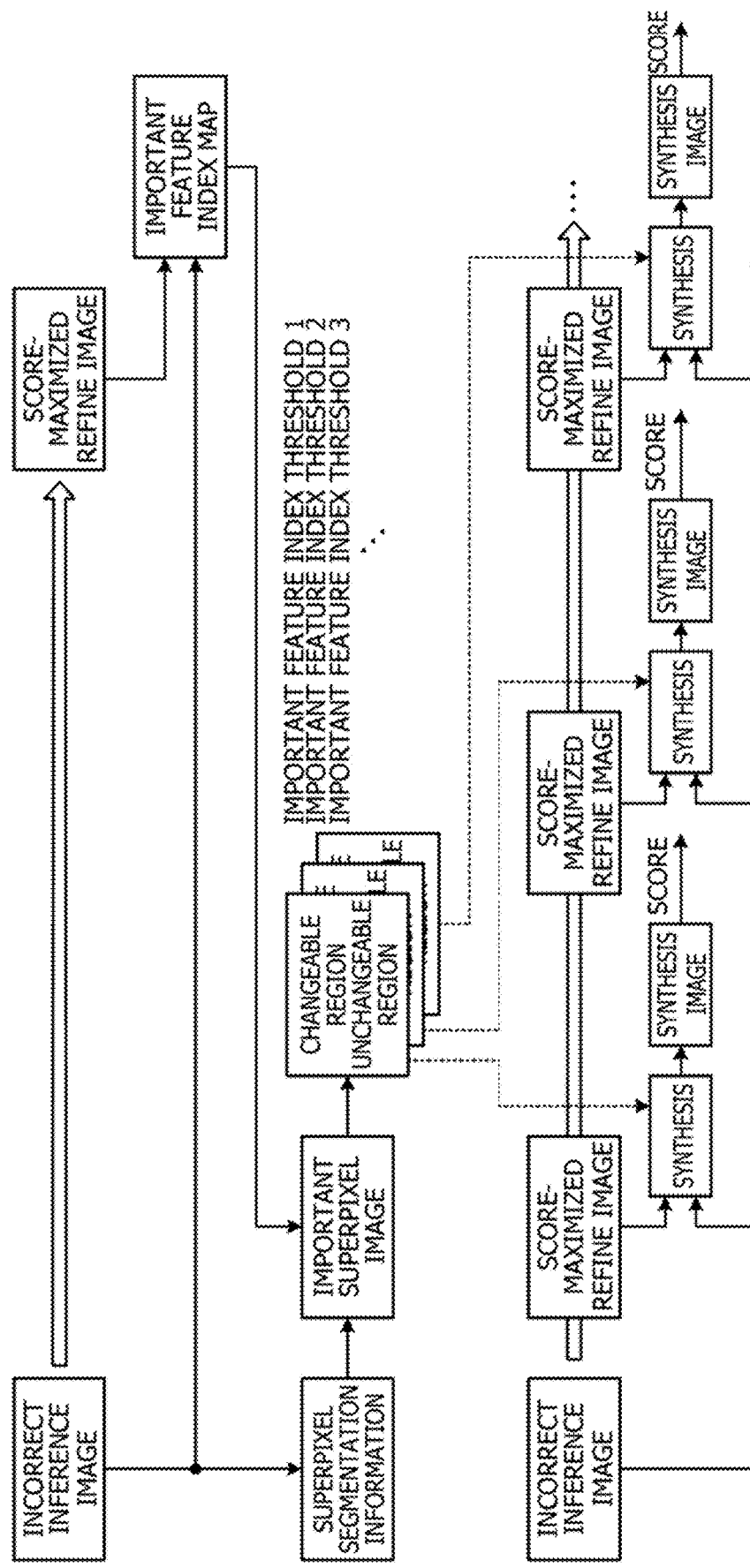
FIG. 16 is a first diagram illustrating a specific example of the incorrect inference cause extracting process.

Next, a specific example of the incorrect inference cause extracting process is described. FIG. 16 is a first diagram illustrating the specific example of the incorrect inference cause extracting process.

As illustrated in FIG. 16, first, when the refine image generating section 141 generates a score-maximized refine image from an incorrect inference image, the map generating section 142 generates an important feature index map.

Subsequently, when the superpixel segmenting part 321 generates superpixel segmentation information based on the incorrect inference image, the important superpixel determining part 322 generates an important superpixel image.

Subsequently, the important superpixel determining part 322 defines changeable regions and unchangeable regions in the important superpixel image based on the important feature index map. At this time, the important superpixel determining part 322 generates a plurality of sets of changeable regions and unchangeable regions, by changing the important feature index threshold and changing a combination selected from superpixels that exceed the important feature index threshold. The important superpixel determining part 322 generates a synthesis image, using the generated plurality of sets of changeable regions and unchangeable regions.

Subsequently, the important superpixel evaluating part 323 acquires a correct label score inferred by the inferring part 303 with the generated synthesis image as the input. As such, the important superpixel evaluating part 323 specifies a combination of superpixels (changeable region) that causes incorrect inference based on the acquired correct label scores and outputs the specified combination as the incorrect inference cause information.

As illustrated in FIG. 16, a synthesis image generating process may be performed on each of a plurality of refine images generated by the refine image generating section 141. Alternatively, the synthesis image generating process may be performed on a refine image of the last time or performed on a refine image (score-maximized refine image) having the best correct label sere in inference with each of the refine images as an input.

As is clear from the above description, the analysis apparatus 100 according to the first embodiment generates the score-maximized refine image having the maximized correct label score of inference, from the incorrect inference image by which an incorrect label is inferred in the image recognition process.

Based on the inferring part structural information at the time of generating the score-maximized refine image, the analysis apparatus 100 according to the first embodiment generates a gray-scaled important feature map for which a pixel value of the non-attention drawing pixel at the time of inference is zero, of a plurality of pixels of the score-maximized refine image.

The analysis apparatus 100 according to the first embodiment generates a degradation scale map that indicates the degree of change of the pixel that is changed when the score-maximized refine image is generated, based on a difference between the score-maximized refine image and the incorrect inference image.

The analysis apparatus 100 according to the first embodiment superimposes the gray-scaled important feature map and the degradation scale map and thereby generates an important feature index map that indicates the degree of importance of each pixel for inferring a correct label.

The analysis apparatus 100 according to the first embodiment generates superpixels by segmenting an incorrect inference image and adds up each pixel value in the important feature index map in the unit of a superpixel. The analysis apparatus 100 according to the first embodiment extracts superpixels having added values larger than or equal to the important feature index threshold, and defines a changeable region and an unchangeable region based on the combination of the superpixels selected from the extracted superpixels.

The analysis apparatus 100 according to the first embodiment infers a correct label by inputting, to the inferring part, the incorrect inference image in which the defined changeable region is replaced with the refine image. The analysis apparatus 100 according to the first embodiment makes inference while changing the important feature index threshold and the combination of superpixels selected, and specifies a combination of superpixel (changeable region) that causes incorrect inference, from each inferred correct label score.

In the first embodiment, by replacing superpixels, which affect inference of a correct label, with a refine image and specifying the superpixels while referring to the effect of replacement, it is possible to specify the image section that causes incorrect inference. As such, according to the first embodiment, it is possible to improve the precision at the time of specifying an image section that causes incorrect inference.

Second Embodiment

In the above-described first embodiment, the important feature index map is generated based on the inferring part structural information at the time of generating the score-maximized refine image. In contrast, in a second embodiment, an important feature index map is generated based on each of the refine images acquired during training conducted till the score-maximized refine image is generated, and an average important feature index map is generated based on the generated important feature index maps The important superpixel determining part 322 extracts superpixels that are larger than or equal to the important feature index threshold, based on the average important feature index map. Hereinafter, the second embodiment is described by focusing on a difference from the above-described first embodiment.

<Functional Configuration of Incorrect Inference Cause Extracting Unit>

Figure 17:
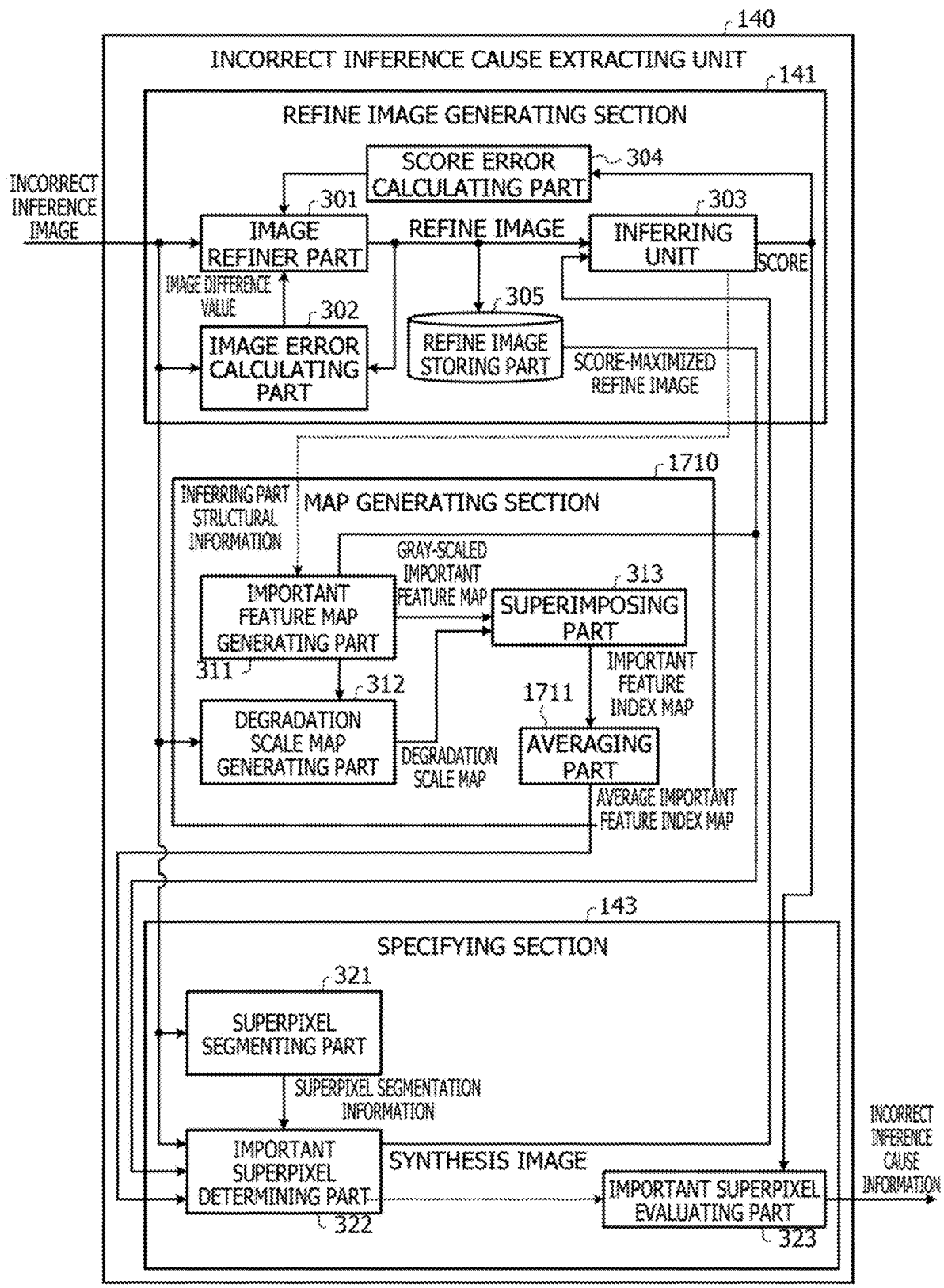
FIG. 17 is a second diagram illustrating an example of the functional configuration of the incorrect inference cause extracting unit.

First, a functional configuration of an incorrect inference cause extracting unit in an analysis apparatus according to the second embodiment is described. FIG. 17 is a second diagram illustrating an example of the functional configuration of the incorrect inference cause extracting unit. A difference from the functional configuration of the incorrect inference cause extracting unit illustrated in FIG. 3 is a map generating section 1710. Hereinafter, the map generating section 1710 is described in detail.

As illustrated in FIG. 17, the map generating section 1710 includes an averaging part 1711, in addition to the important feature map generating part 311, the degradation scale map generating part 312, and the superimposing part 313.

The map generating section 1710 sequentially acquires a refine image generated during training of the image refiner part 301 and inferring part structural information at the time when the inferring part 303 makes inference with the refine image as an input. Every time the map generating section 1710 acquires a refine image and inferring part structural information, in the map generating section 1710, the important feature map generating part 311, the degradation scale map generating part 312, and the superimposing part 313 operate and generate an important feature index map.

Every time the important feature map generating part 311 and the degradation scale map generating part 312 acquire the refine image and the inferring part structural information, the averaging part 1711 calculates an average value of a plurality of important feature index maps generated by the superimposing part 313, and generates an average important feature index map.

<Specific Example of Incorrect Inference Cause Extracting Process>

Figure 18:
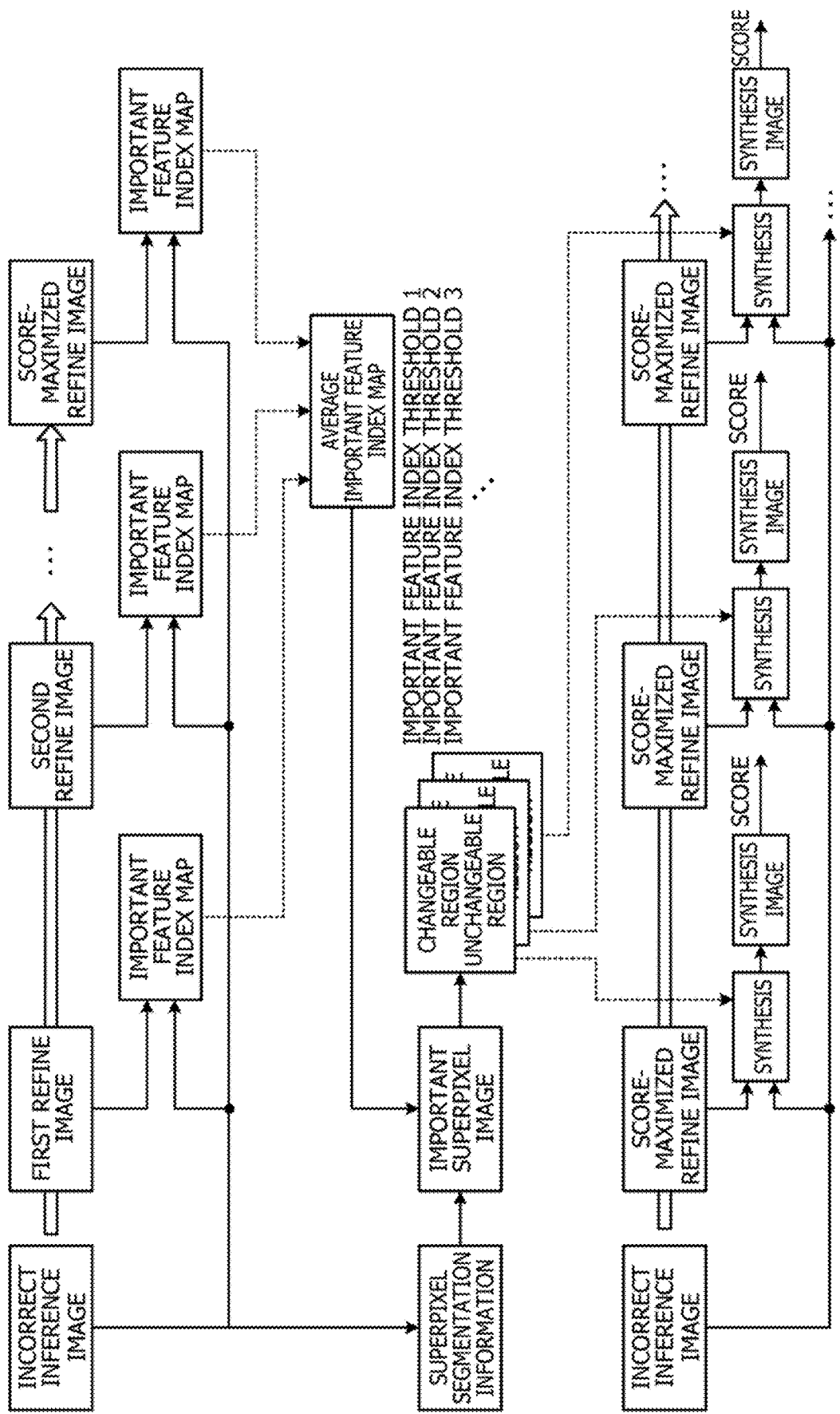
FIG. 18 is a second diagram illustrating a specific example of the incorrect inference cause extracting process.

Next, a specific example of the incorrect inference cause extracting process is described. FIG. 18 is a second diagram illustrating the specific example of the incorrect inference cause extracting process.

As illustrated in FIG. 18, in the refine image generating section 141, when the image refiner part 301 generates a refine image from the incorrect inference image based on a first training result, the map generating section 1710 generates an important feature index map.

In the refine image generating section 141, when the image refiner part 301 generates a refine image from the incorrect inference image based on a second training result, the map generating section 1710 generates an important feature index map. Thereafter, when the refine image generating section 141 generates a score-maximized refine image by repeating similar processing, the map generating section 1710 generates an important feature index map.

Subsequently, the averaging part 1711 acquires a plurality of important feature index maps generated in a period from when the first refine image is generated to when the score-maximized refine image is generated. The averaging part 1711 calculates an average value of the plurality of important feature index maps thus acquired and generates an average important feature index map.

Subsequently, the superpixel segmenting part 321 generates the superpixel segmentation information based on the incorrect inference image, and the important superpixel determining part 322 generates an important superpixel image.

Subsequently, the important superpixel determining part 322 defines changeable regions and unchangeable regions in the important superpixel image based on the average important feature index map. At this time, the important superpixel determining part 322 generates a plurality of sets of changeable regions and unchangeable regions, by changing the important feature index threshold and changing a combination selected from superpixels that exceed the important feature index threshold. The important superpixel determining part 322 generates a synthesis image, using the generated plurality of sets of changeable regions and unchangeable regions.

Subsequently, the important superpixel evaluating part 323 acquires a correct label score inferred by the inferring part 303 with the generated synthesis image as the input. As such, the important superpixel evaluating part 323 specifies a combination of superpixels (changeable region) that causes incorrect inference based on the acquired correct label and outputs the specified combination as the incorrect inference cause information.

In the above-described incorrect inference cause extracting process, a refine image may be acquired and an important feature index map may be generated at arbitrary intervals. The important feature index map may be generated at every training iteration or the important feature index map may be generated every time after a plurality of training iterations. Alternatively, a correct label score of the inferring part 303 when a refine image is inputted may be evaluated. When the correct label score is larger than a predetermined threshold, the refine image may be acquired to generate an important feature index map.

As illustrated in FIG. 18, the synthesis image generating process may be performed on each of a plurality of refine images generated by the refine image generating section 141. Alternatively, the synthesis image generating process may be performed on a refine image of the last time or performed on a refine image (score-maximized refine image) having the best correct label score in inference with each of the refine images as an input.

As is clear from the above description, the analysis apparatus 100 according to the second embodiment generates an average important feature index map based on important feature index maps generated during training conducted until a score-maximized refine image is generated. The analysis apparatus 100 according to the second embodiment extracts superpixels that are larger than or equal to the important feature index threshold, based on the average important feature index map.

As such, according to the second embodiment, it is possible to further reduce the influence on the important feature index map caused by fluctuations in refine images, in addition to the effect by the above-described first embodiment.

Third Embodiment

In the above-described first embodiment, description is given in which when the score-maximized refine image is generated and the important feature index map is generated, the specifying section 143 starts the process of defining the changeable region and the unchangeable region and specifying the image section that causes incorrect inference.

In the above-described second embodiment, description is given in which when the score-maximized refine image is generated and the average important feature index map is generated, the specifying section 143 starts the process of defining the changeable region and the unchangeable region and specifying the image section that causes incorrect inference.

In contrast, in the third embodiment, after the specifying section 143 defines the changeable region and the unchangeable region, the refine image generating section evaluates the defined changeable region and regenerates a score-maximized refine image again.

In this manner, according to the third embodiment, it is possible to generate an important feature index map (or an average important feature index map) in which a feature portion that affects inference of a correct label is more clarified, by evaluating the changeable region and regenerating the score-maximized refine image. As a result, it becomes possible to increase the score at the time of inferring a label with a synthesis image as an input.

Hereinafter, the third embodiment is described by focusing on a differences from the above-described first and second embodiments.

<Functional Configuration of Incorrect Inference Cause Extracting Unit>

Figure 19:
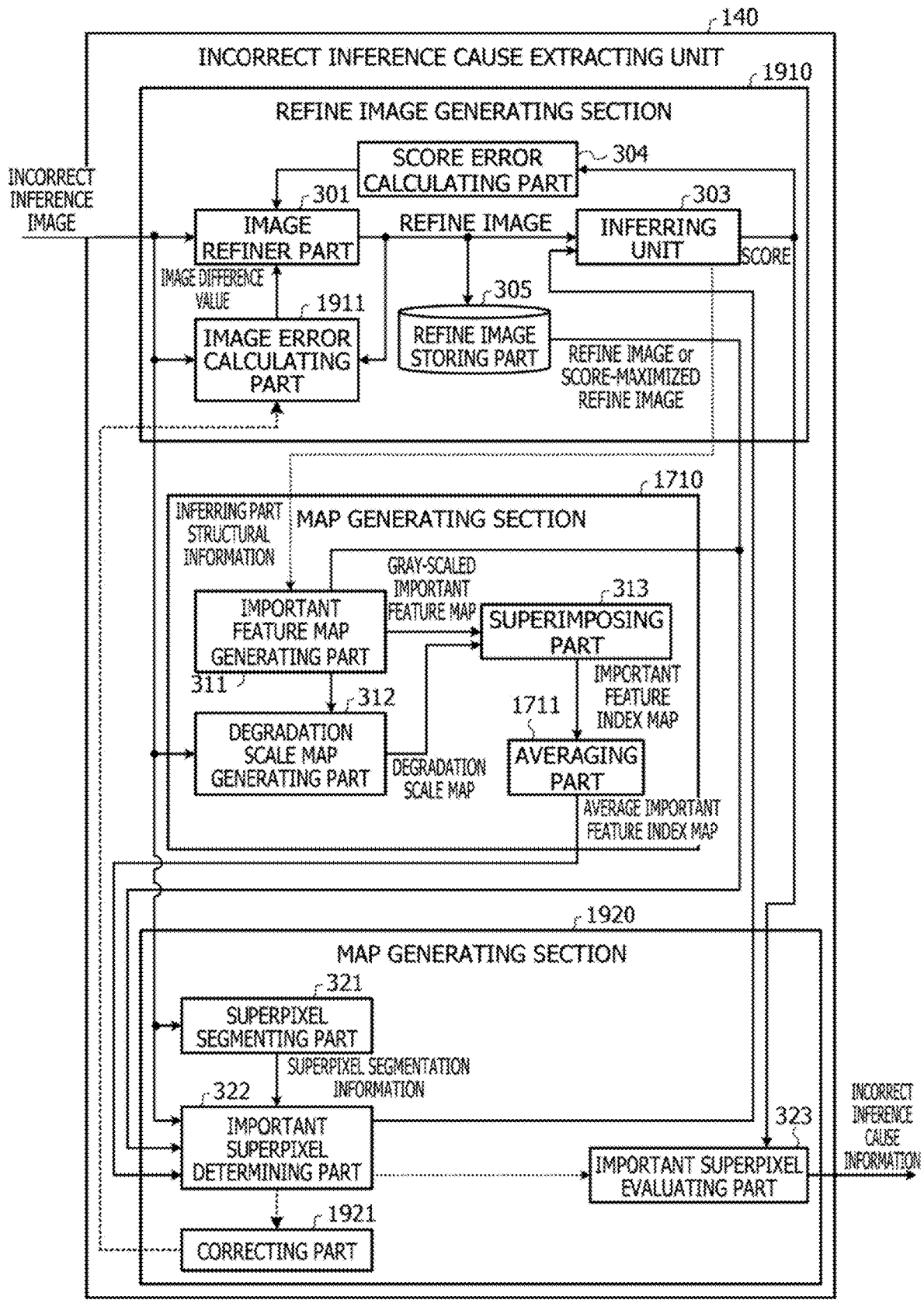
FIG. 19 is a third diagram illustrating an example of the functional configuration of the incorrect inference cause extracting unit.

First, a functional configuration of an incorrect inference cause extracting unit in an analysis apparatus according to the third embodiment is described. FIG. 19 is a third diagram illustrating an example of the functional configuration of the incorrect inference cause extracting unit. Differences from the functional configuration of the incorrect inference cause extracting unit illustrated in FIG. 17 are a refine image generating section 1910 and a specifying section 1920. First, the refine image generating section 1910 and the specifying section 1920 are described in detail.

(1) Details of Refine Image Generating Section

First, the refine image generating section 1910 is described in detail. As illustrated in FIG. 19, the refine image generating section 1910 includes an image error calculating part 1911 having a different function from that of the image error calculating part 302 of the refine image generating section 141.

Like the image error calculating part 302, the image error calculating part 1911 calculates a difference between an incorrect inference image inputted to the image refiner part 301 during training and a refine image outputted from the image refiner part 301 during the training, and inputs an image difference value to the image refiner part 301. In the case of the image error calculating part 1911, however, when inputting the image difference value to the image refiner part 301, the image error calculating part 1911 corrects the image difference value for the image section corresponding to the changeable region notified by a correcting part 1921.

For example, the image error calculating part 1911 makes correction by multiplying the image difference value of the image section corresponding to the changeable region by a coefficient less than 1. This allows the image refiner part 301 to regenerate a score-maximized refine image after retraining with the image difference value of the image section corresponding to the changeable region that is made weaker than an image difference value of an image section corresponding to any region other than the changeable region.

(2) Details of Specifying Section

Next, the specifying section 1920 is described in detail. As illustrated in FIG. 19, the specifying section 1920 includes the correcting part 1921, in addition to the superpixel segmenting part 321, the important superpixel determining part 322, and the important superpixel evaluating part 323.

The correcting part 1921 acquires the changeable region defined by the important superpixel determining part 322 and notifies the image error calculating part 1911 of the changeable region. This allows the refine image generating section 1910 to have retraining while evaluating the changeable region, and then regenerate a score-maximized refine image.

<Specific Example of Incorrect Inference Cause Extracting Process>

Figure 20:
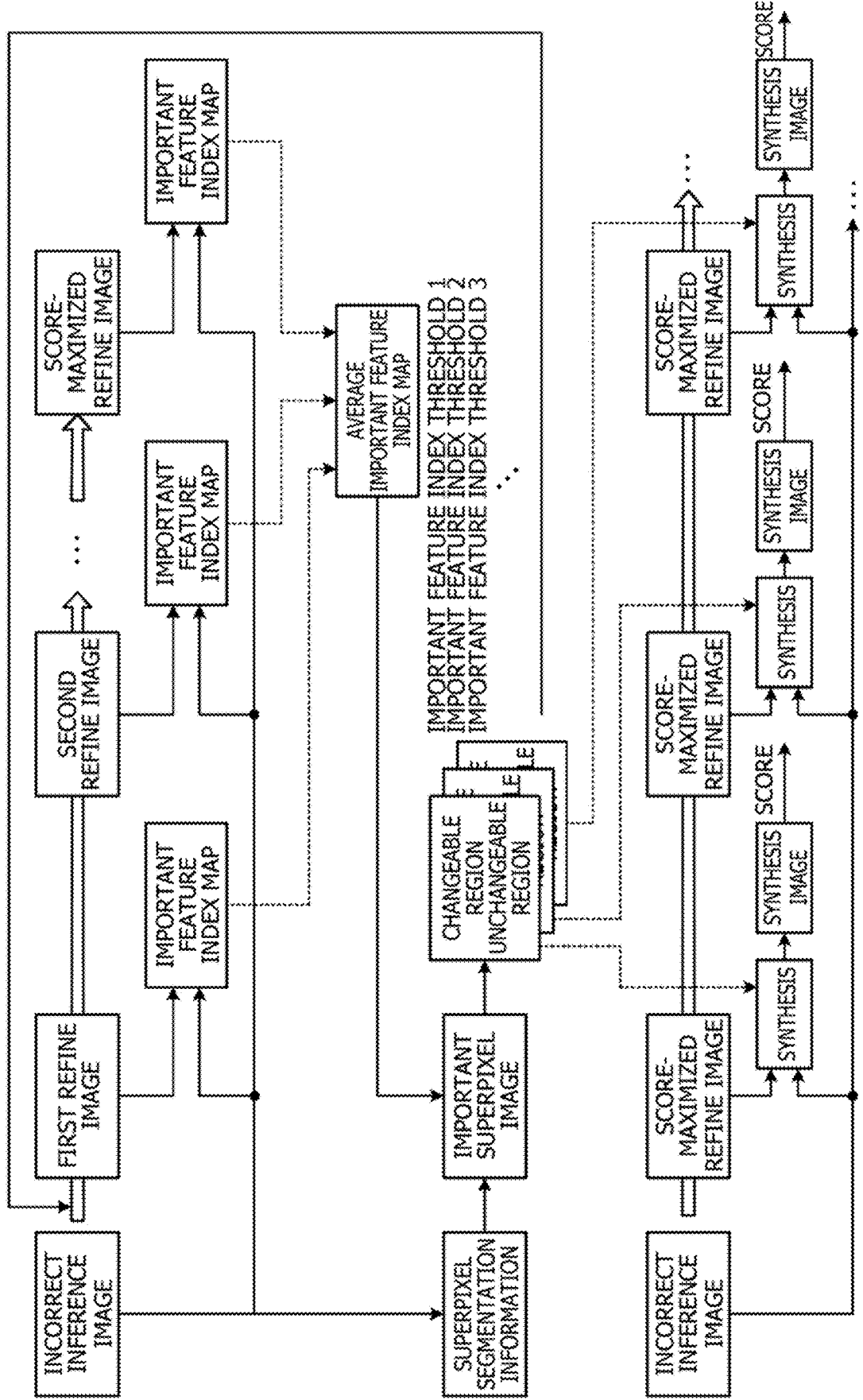
FIG. 20 is a third diagram illustrating a specific example of the incorrect inference cause extracting process.

Next, a specific example of the incorrect inference cause extracting process is described. FIG. 20 is a third diagram illustrating the specific example of the incorrect inference cause extracting process. A difference from the specific example of the incorrect inference cause extracting process described using FIG. 18 is that when a set of a changeable region and an unchangeable region is generated based on an important superpixel image, the correcting part 1921 notifies the image error calculating part 1911 of the changeable region. This allows the refine image generating section 1910 to have retraining while evaluating the changeable region and then regenerate a score-maximized refine image, and allows the map generating section 1710 to regenerate an average important feature index map.

In the above-described incorrect inference cause extracting process, a refine image may be acquired and an important feature index map may be generated at arbitrary intervals. The important feature index map may be generated at every training iteration or the important feature index map may be generated every time after a plurality of training iterations. Alternatively, a correct label score of the inferring part 303 when a refine image is inputted may be evaluated. When the correct label score is larger than a predetermined threshold, the refine image may be acquired to generate an important feature index map.

As illustrated in FIG. 20, the synthesis image generating process may be performed on each of a plurality of refine images generated by the refine image generating section 1910. Alternatively, the synthesis image generating process may be performed on a refine image of the last time or performed on a refine image (score-maximized refine image) having the best correct label score in inference with each of the refine images as an input.

As is clear from the above description, the analysis apparatus 100 according to the third embodiment regenerates a score-maximized refine image by having retraining while evaluating the changeable region, and regenerates an important feature index map (or an average important feature index map).

As such, according to the third embodiment, it is possible to generate an important feature index map (or an average important feature index map) in which a feature portion that affects inference of a correct label is more clarified and to increase the score at the time of inferring a label with a synthesis image as an input.

Fourth Embodiment

In the above-described first to third embodiments, description is given in which a combination of superpixels (changeable region) that causes incorrect inference is specified and the specified combination is outputted as the incorrect inference cause information. However, a method of outputting the incorrect inference cause information is not limited to this, and for example, an important portion in a changeable region may be visualized and outputted. Hereinafter, the fourth embodiment is described by focusing on a difference from the above-described first to third embodiments.

<Functional Configuration of Incorrect Inference Cause Extracting Unit>

Figure 21:
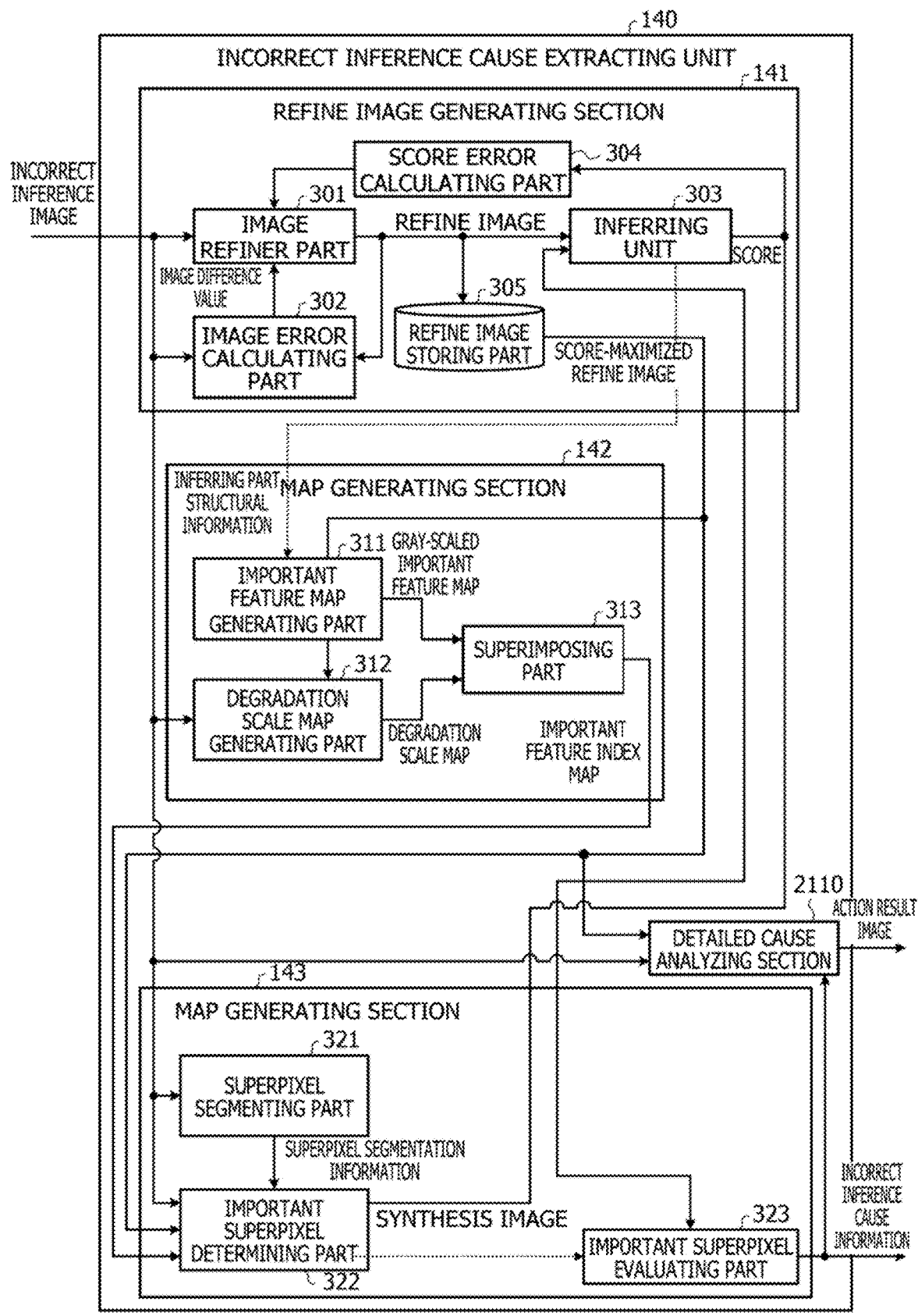
FIG. 21 is a fourth diagram illustrating an example of the functional configuration of the incorrect inference cause extracting unit.

First, a functional configuration of an incorrect inference cause extracting unit in an analysis apparatus 100 according to the fourth embodiment is described. FIG. 21 is a fourth diagram illustrating an example of the functional configuration of the incorrect inference cause extracting unit. A difference from the functional configuration of the incorrect inference cause extracting unit 140 illustrated in FIG. 3 is that the incorrect inference cause extracting unit includes a detailed cause analyzing section 2110.

The detailed cause analyzing section 2110 visualizes an important portion in a changeable region using the incorrect inference image and the score-maximized refine image, and outputs the visualized important portion as an action result image.

<Functional Configuration of Detailed Cause Analyzing Section>

Figure 22:
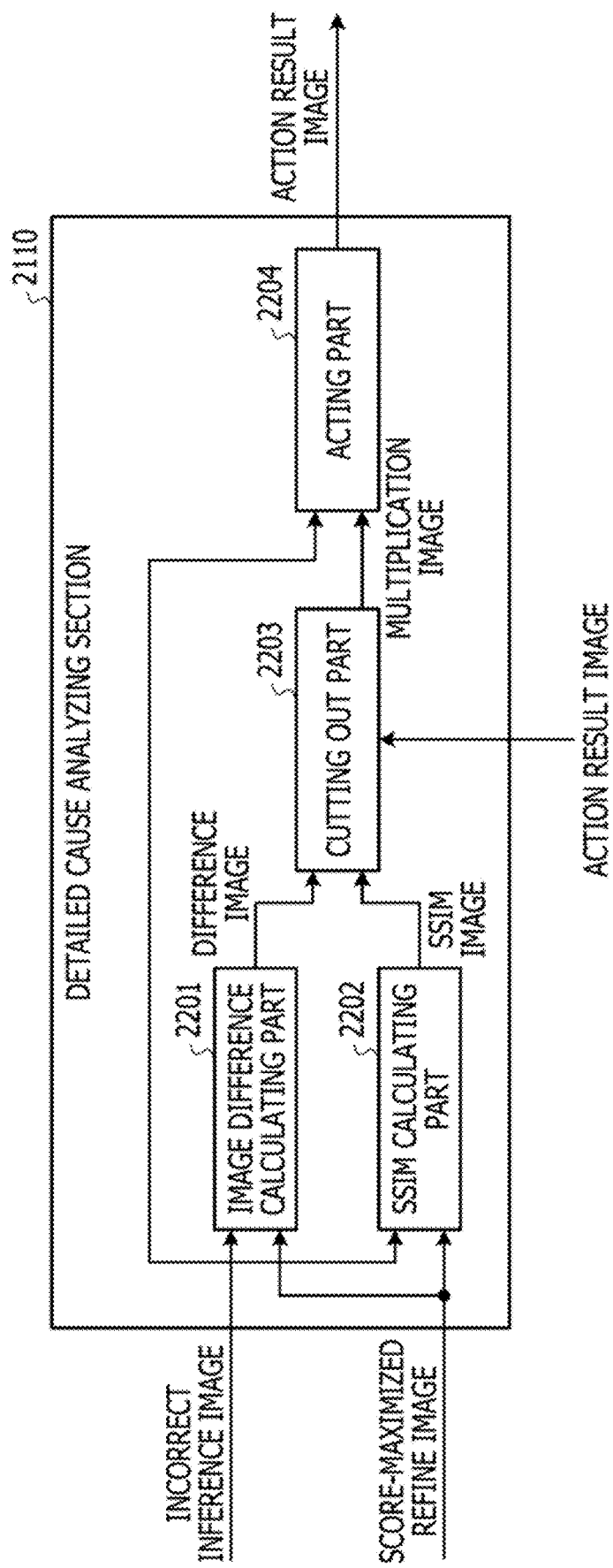
FIG. 22 is a first diagram illustrating an example of a functional configuration of a detailed cause analyzing section.

Next, a functional configuration of the detailed cause analyzing section 2110 is described. FIG. 22 is a first diagram illustrating an example of the functional configuration of the detailed cause analyzing section. As illustrated in FIG. 22, the detailed cause analyzing section 2110 includes an image difference calculating part 2201, an SSIM calculating part 2202, a cutting out part 2203, and an acting part 2204.

The image difference calculating part 2201 calculates a difference between the incorrect inference image and the score-maximized refine image in the unit of a pixel, and outputs a difference image.

The SSIM calculating part 2202 performs SSIM calculation using the incorrect inference image and the score-maximized refine image, and outputs an SSIM image.

The cutting out part 2203 cuts out an image section corresponding to the changeable region from the difference image. The cutting out part 2203 cuts out an image section corresponding to the changeable region from the SSIM image. The cutting out part 2203 generates a multiplication image by multiplying the difference image, from which the image section corresponding to the changeable region is removed, and the SSIM image.

The acting part 2204 generates an action result age based on the incorrect inference image and the multiplication image.

<Specific Example of Processing of Detailed Cause Analyzing Section>

Figure 23:
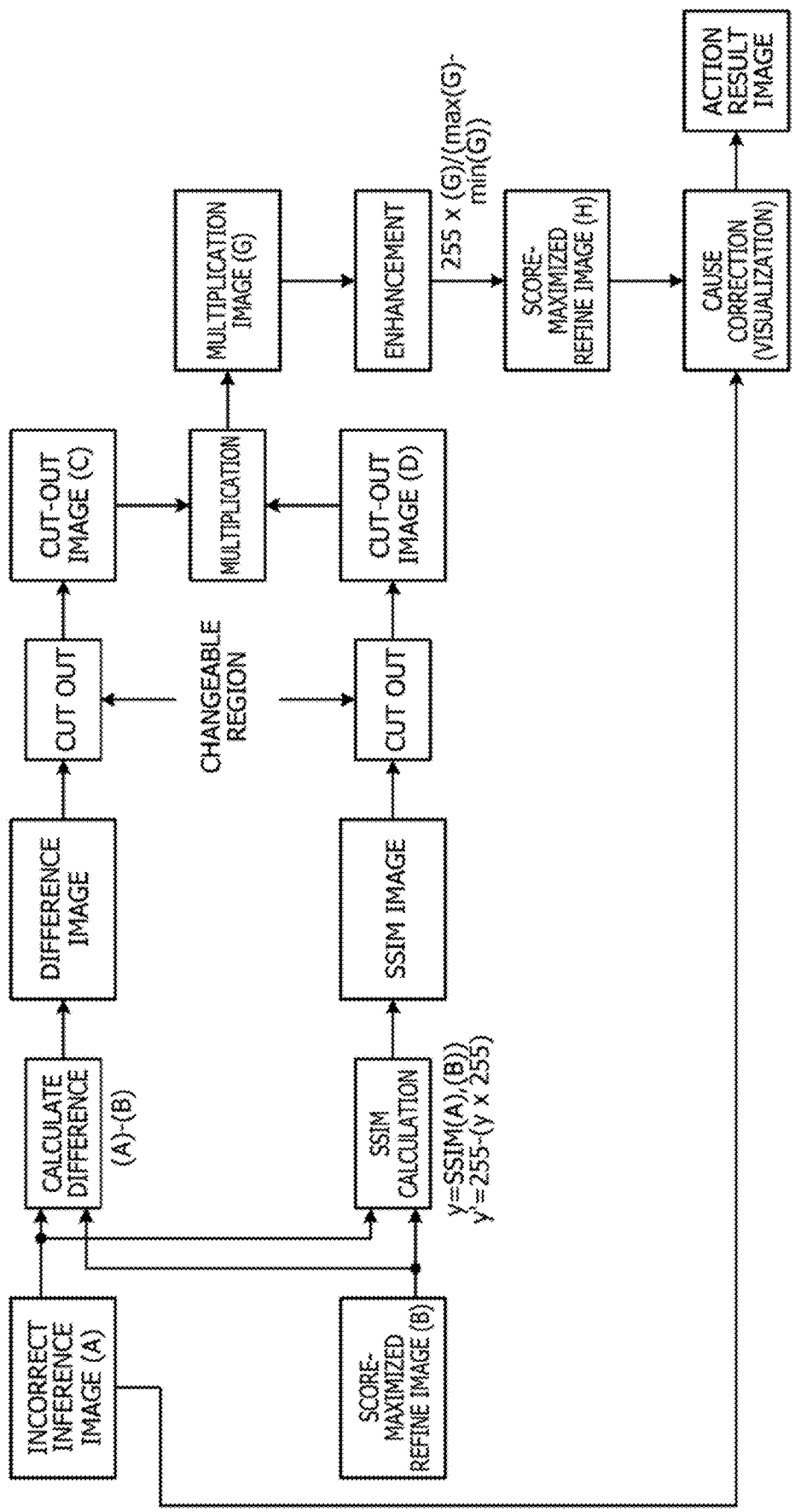
FIG. 23 is a first diagram illustrating a specific example of processing of the detailed cause analyzing section.

Next, a specific example of processing of the detailed cause analyzing section 2110 is described. FIG. 23 illustrates the specific example of the processing of the detailed cause analyzing section.

As illustrated in FIG. 23, first, the image difference calculating part 2201 calculates a difference between the incorrect inference image (A) and the score-maximized refine image (B)(=(A)−(B)), and outputs a difference image. The difference image is pixel correction information in an image section that causes incorrect inference.

Subsequently, the SSIM calculating part 2202 performs the SSIM calculation based on the incorrect inference image (A) and the score-maximized refine image (B) (y=SSXM ((A), (B)). The SSIM calculating part 2202 outputs an SSIM image by inverting a result of the SSIM calculation (y'=255−(y×255)). The SSIM image is an image designating the image section that causes incorrect inference, with high precision. A larger pixel value represents a larger difference and a smaller pixel value represents a smaller difference. The process of inverting the result of the SSIM calculation may be performed by calculating y'=1−y, for example.

Subsequently, the cutting out part 2203 cuts out the image section corresponding to the changeable region from the difference image, and outputs a cut-out image (C). Similarly, the cutting out part 2203 cuts out the image section corresponding to the changeable region from the SSIM image, and outputs a cut-out image (D).

The changeable region is a region that specifies the image section that causes incorrect inference. The detailed cause analyzing section 2110 is intended to further perform cause analysis at a pixel-size level in the specified region.

To this end, the cutting out part 2203 generates a multiplication image (G) by multiplying the cut-out image (C) and the cut-out image (D). The multiplication image (G) is nothing less than pixel correction information that further designates the pixel correction information at the image section that causes incorrect inference, with higher precision.

The cutting out part 2203 performs an enhancing process on the multiplication image (G) and outputs an enhanced multiplication image (H). The cutting out part 2203 calculates the enhanced multiplication image (H) based on the following equation:

$$\text{Enhanced multiplication image }(H)=255\times(G)/(\max(G)-\min(G)) \quad \text{(Equation 3)}$$

Subsequently, the acting part 2204 generates the action result image by subtracting the enhanced multiplication image (H) from the incorrect inference image (A) and visualizing an important portion.

The method of the enhancing process illustrated in FIG. 23 is merely an example. The enhancing process may be performed by using another method as long as the method makes it easier to distinguish the important portion after visualization.

<Flow of Detailed Cause Analyzing Process>

Figure 24:
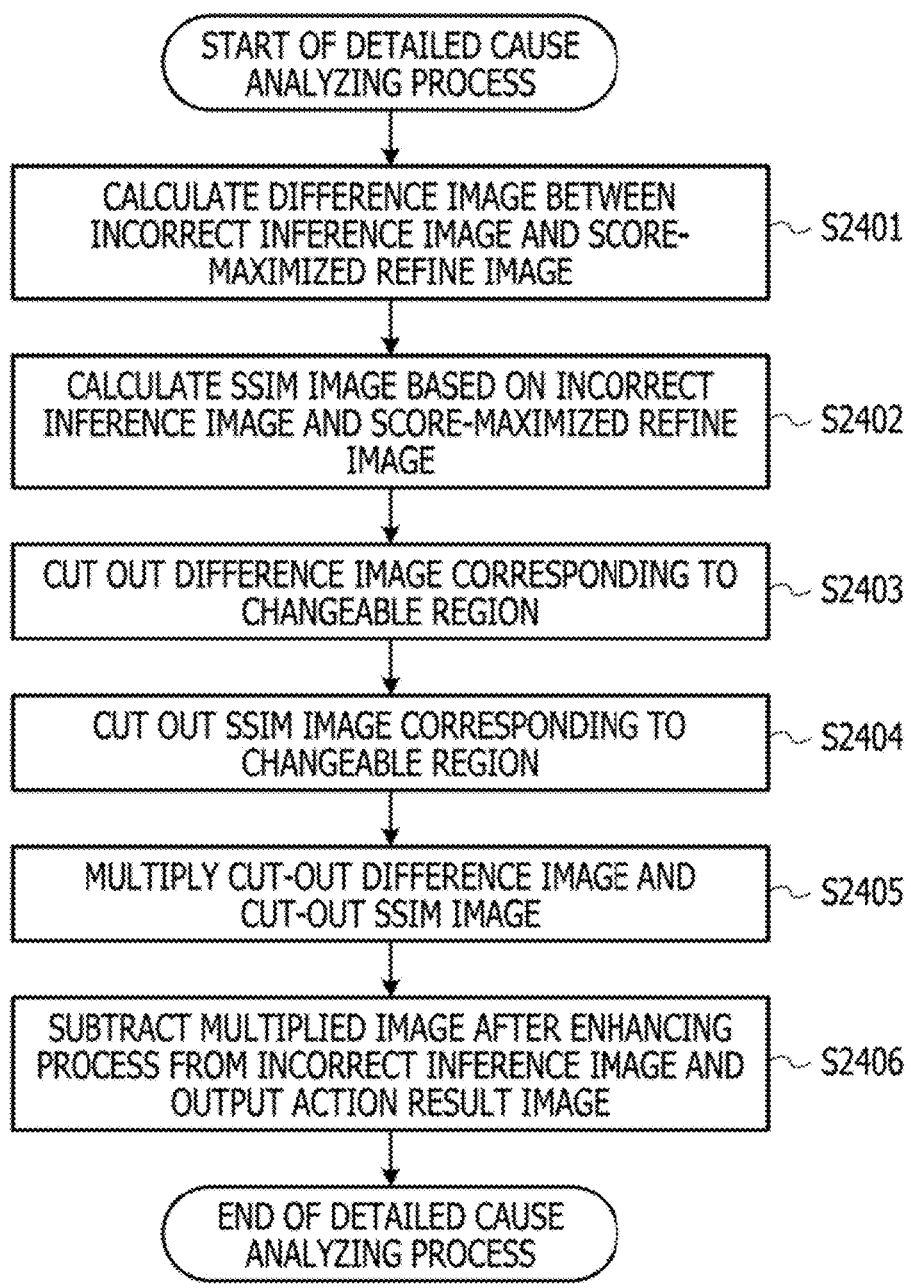
FIG. 24 is a first flowchart illustrating flow of a detailed cause analyzing process.

Next, flow of a detailed cause analyzing process performed by the detailed cause analyzing section 2110 is described. FIG. 24 is a first flowchart illustrating first flow of the detailed cause analyzing process.

In step S2401, the image difference calculating part 2201 calculates a difference image between an incorrect inference image and a score-maximized refine image.

In step S2402, the SSIM calculating part 2202 calculates an SSIM image based on the incorrect inference image and the score-maximized refine image.

In step S2403, the cutting out part 2203 cuts out a difference image corresponding to a changeable region.

In step S2404, the cutting out part 2203 cuts out an SSIM age corresponding to the changeable region.

In step S2405, the cutting out part 2203 generates a multiplication image by multiplying the cut out difference image and the cut out SSIM image.

In step S2406, the cutting out part 2203 performs the enhancing process on the multiplication image. The acting part 2204 subtracts the multiplication image subjected to the enhancing process from the incorrect inference image, and outputs an action result image.

As is clear from the above description, the analysis apparatus 100 according to the fourth embodiment generates the difference image and the SSIM image based on the incorrect inference image and the score-maximized refine image, and cuts out and multiplies the changeable regions. As such, according to the fourth embodiment, it is possible to visually check an image section that causes incorrect inference in the changeable region in the unit of a pixel, with the analysis apparatus 100 according to the fourth embodiment.

Fifth Embodiment

In the above-described fourth embodiment, description is given of a case where the image section that causes incorrect inference is visualized in the unit of a pixel, using the difference image and the SSIM image generated based on the incorrect inference image and the score-maximized refine image.

In contract, in the fifth embodiment, an image section that causes incorrect inference is visualized in the unit of a pixel, by further using a gray-scaled important feature map. Hereinafter, the fifth embodiment is described by focusing on a difference from the above-described fourth embodiment.

<Functional Configuration of Incorrect Inference Cause Extracting Unit>

Figure 25:
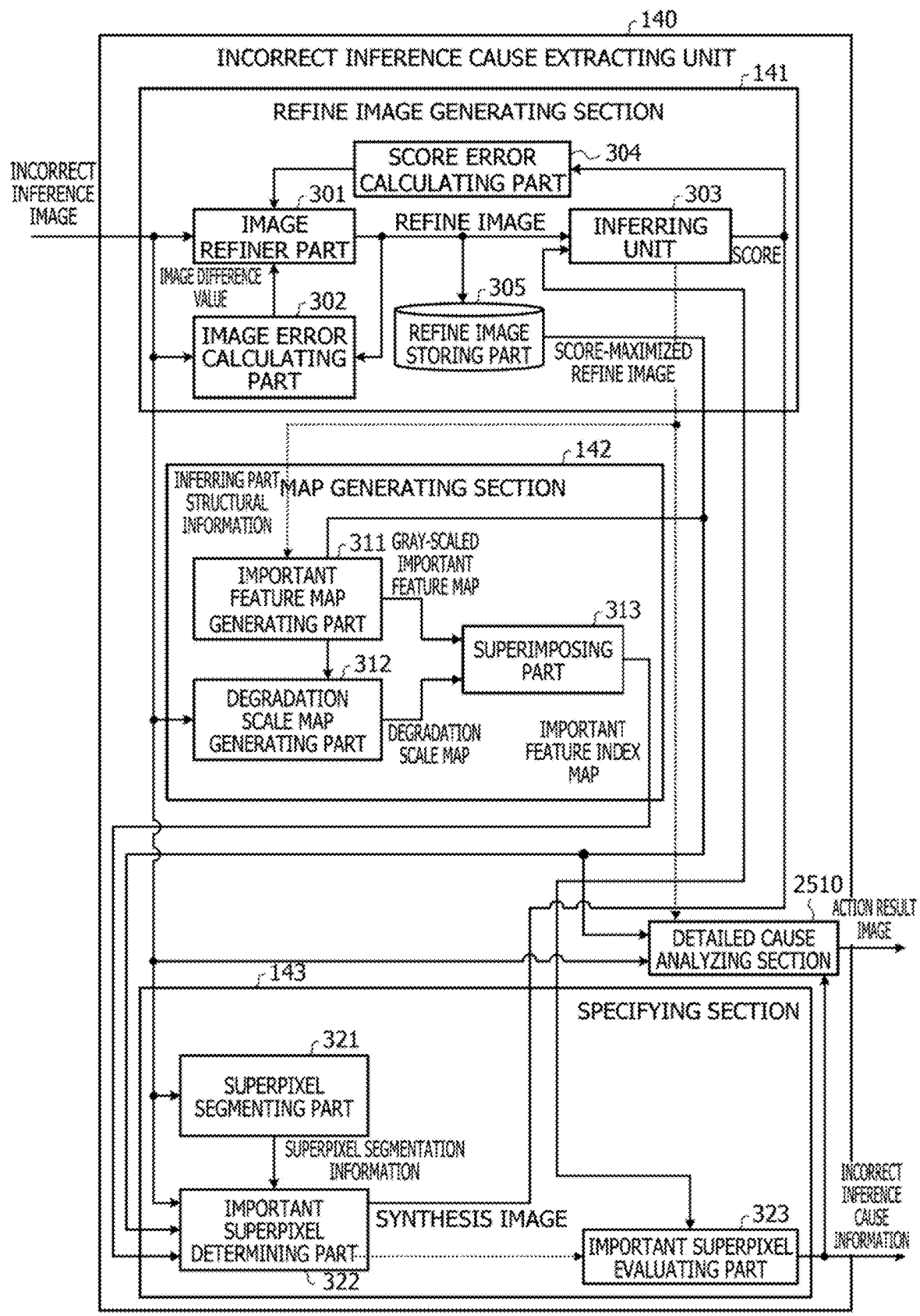
FIG. 25 is a fifth diagram illustrating an example of the functional configuration of the incorrect inference cause extracting unit.

First, a functional configuration of an incorrect inference cause extracting unit in an analysis apparatus 100 according to the fifth embodiment is described. FIG. 25 is a fifth diagram illustrating an example of the functional configuration of the incorrect inference cause extracting unit. Differences from the functional configuration of the incorrect inference cause extracting unit illustrated in FIG. 21 are that the function of a detailed cause analyzing section 2510 in FIG. 25 differs from the function of the detailed cause analyzing section 2110 illustrated in FIG. 21 and that the detailed cause analyzing section 2510 acquires the inferring part structural information from the inferring part 303.

The detailed cause analyzing section 2510 visualizes an image section that causes incorrect inference in the unit of a pixel, using a difference image, an SSIM image, and an gray-scaled important feature map, which are generated based on an incorrect inference image, a score-maximized refine image, and inferring part structural information.

The difference image, the SSIM image, and the gray-scaled important feature map, used by the detailed cause analyzing section 2510 to visualize an image section that causes incorrect inference in the unit of a pixel have the following attributes. • The difference image: Difference information for each pixel, having a positive or negative value that indicates how much correction is to be made to improve the classification probability of a designated label. • The SSIM image: Difference information considering states of change in the entire image and a local region, the information having less artifacts (unintentional noise) than difference information for each pixel. For example, the difference information with higher precision (However, the information is a positive value only). • Gray-scaled important feature map: A map that visualizes a feature portion that affects correct label inference.

<Functional Configuration of Detailed Cause Analyzing Section>

Figure 26:
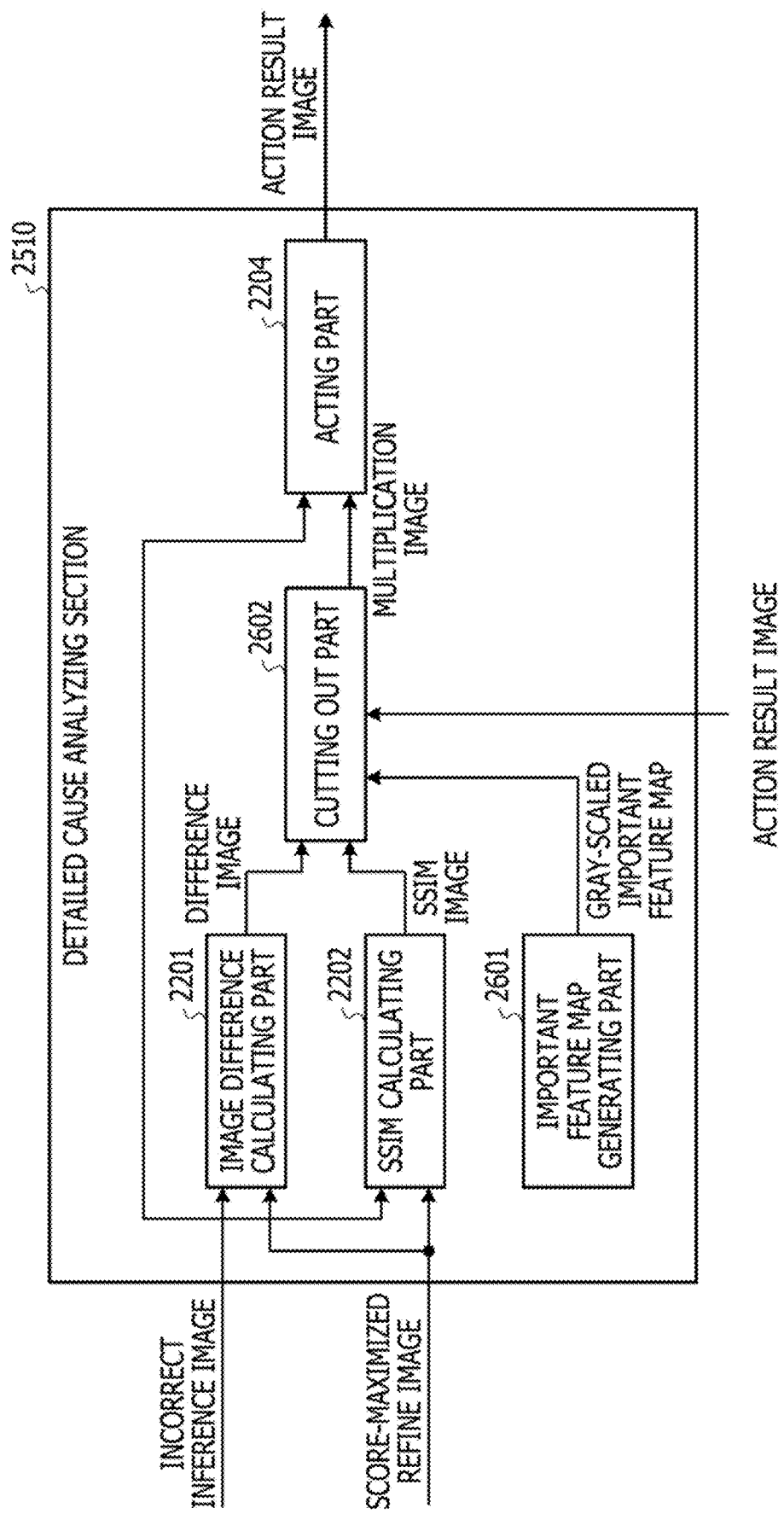
FIG. 26 is a second diagram illustrating an example of the functional configuration of the detailed cause analyzing section.

Next, a functional configuration of the detailed cause analyzing section 2510 is described. FIG. 26 is a second diagram illustrating an example of the functional configuration of the detailed cause analyzing section. Differences from the functional configuration illustrated in FIG. 22 are that in the case of FIG. 26, the detailed cause analyzing section includes an important feature map generating part 2601 and that the function of a cutting out part 2602 differs from the function of the cutting out part 2203 illustrated in FIG. 22.

The important feature map generating part 2601 acquires, from the inferring part 303, inferring part structural information at the time of making inference with the score-maximized refine image as an input. The important feature map generating part 2601 generates a gray-scaled important feature map based on the inferring part structural information, by using the selective BP method.

The cutting out part 2602 cuts out an image section corresponding to the changeable region from the gray-scaled important feature map, in addition to cutting out an image section corresponding to the changeable region from the difference image and the SSIM image. The cutting out part 2602 generates a multiplication image by multiplying the difference image, the SSIM image, and the gray-scaled important feature map, from which the image sections corresponding to the changeable regions are cut out.

Multiplying the difference image, the SSIM image, and the gray-scaled important feature map in this manner makes it possible to visually check an image section in the unit of a pixel, in the action result image, that causes incorrect inference.

Use of the difference image in the multiplication automatically corrects the action result image to an image that increases a correct label score. Therefore, the difference image may be outputted as the action result image. When such an advantage is not taken into consideration, the detailed cause analyzing section 2510 may multiply using the SSIM image and the gray-scaled important feature map (rather than using the difference image), and output the action result image.

<Specific Example of Processing of Detailed Cause Analyzing Section>

Figure 27:
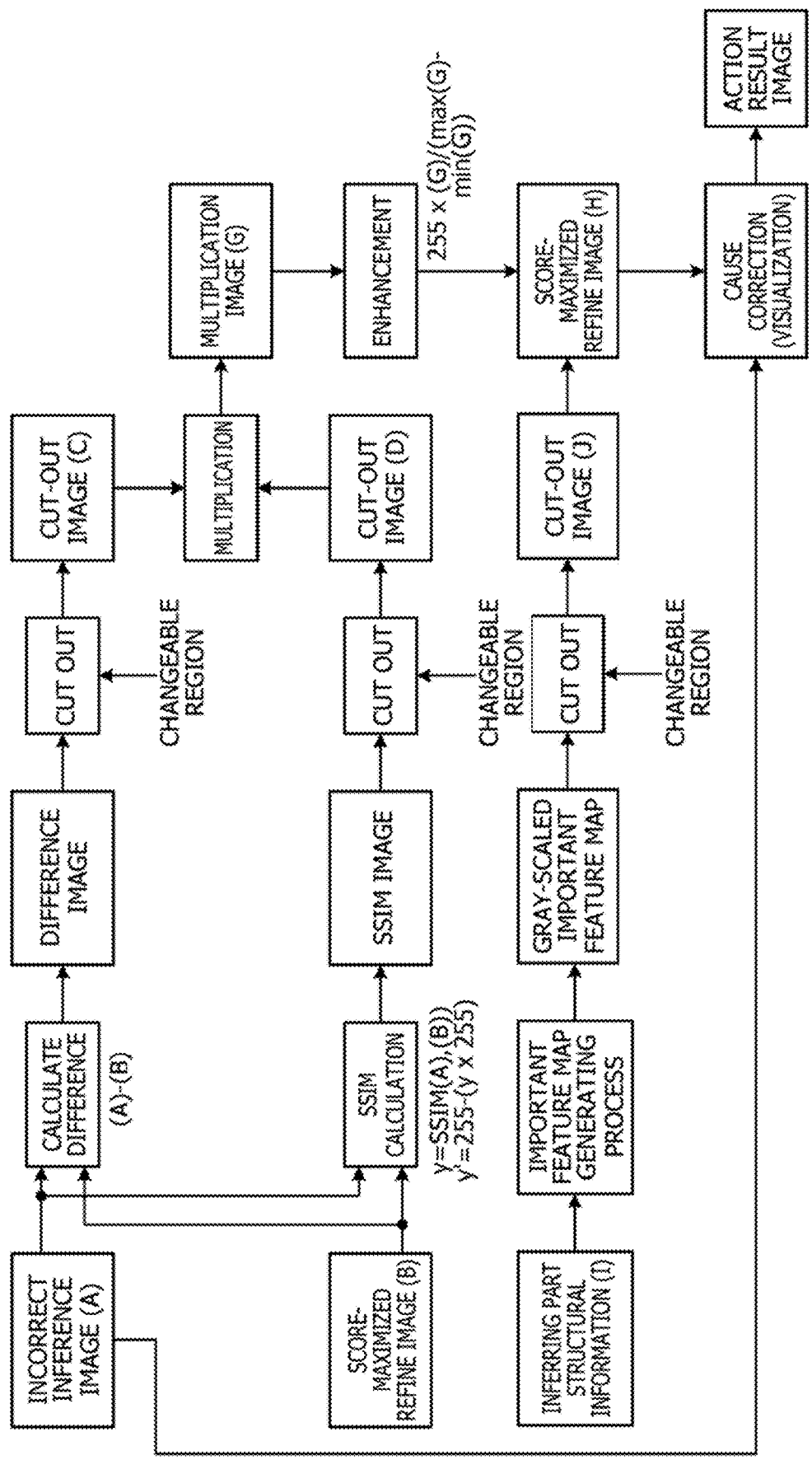
FIG. 27 is a second diagram illustrating a specific example of processing of the detailed cause analyzing section.

Next, a specific example of processing of the detailed cause analyzing section 2510 is described. FIG. 27 is a second diagram illustrating the specific example of the processing of the detailed cause analyzing section. A first difference from the specific example of the processing of the detailed cause analyzing section 2110 in FIG. 23 is that the important feature map generating part 2601 performs the important feature map generating process using the selective BP method based on inferring part structural information (I), and generates a gray-scaled important feature map. A second difference is that the cutting out part 2602 cuts out an image section corresponding to the changeable region from the gray-scaled important feature map, and outputs a cut-out image (J). A third difference is that the cutting out part 2602 multiplies the cut-out image (C), and the cut-out image (D), and the cut-out image (J), and generates the multiplication image (G).

<Flow of Detailed Cause Analyzing Process>

Figure 28:
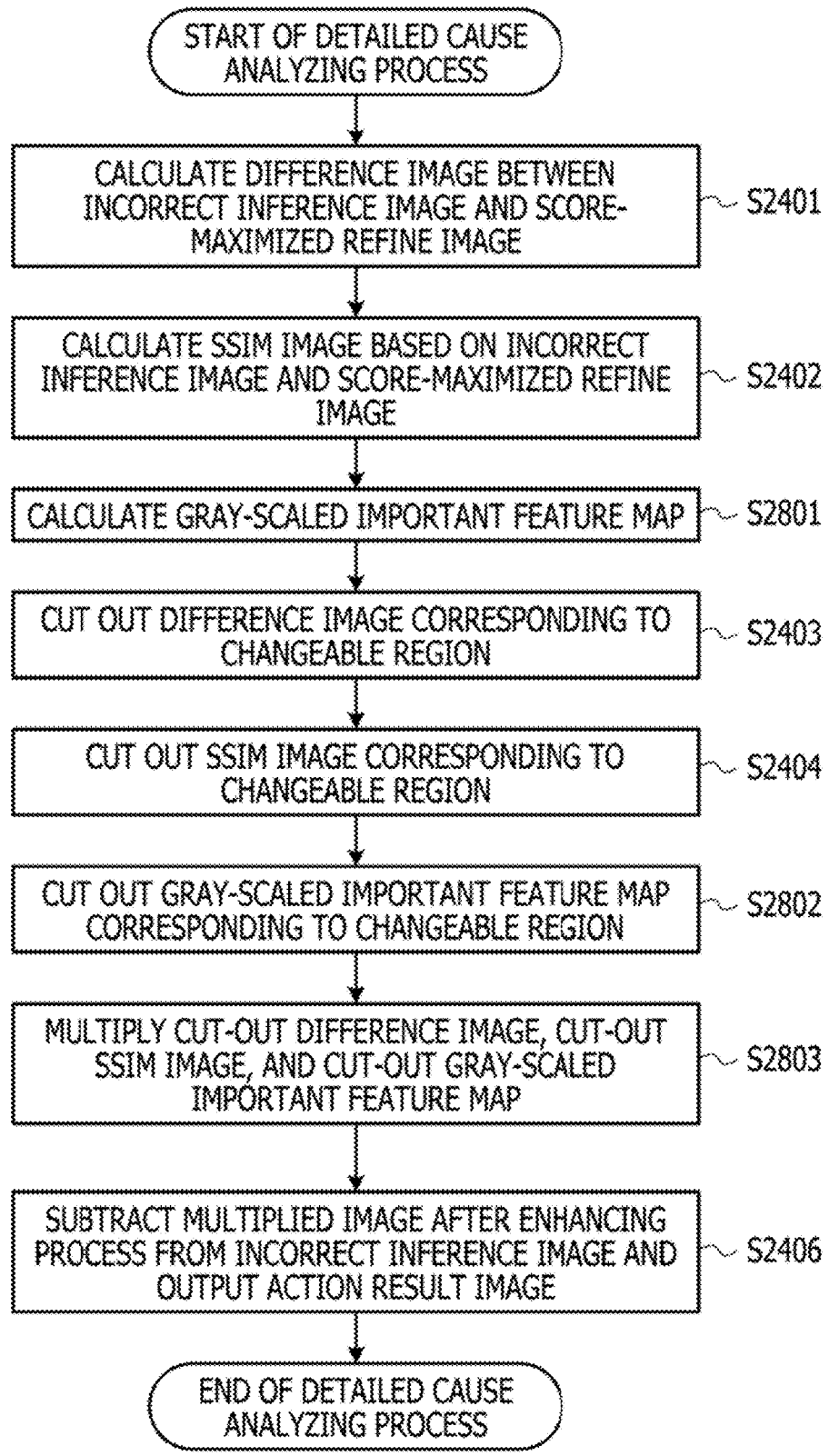
FIG. 28 is a second flowchart illustrating the flow of the detailed cause analyzing process.

Next, flow of the detailed cause analyzing process performed by the detailed cause analyzing section 2510 is described. FIG. 28 is a second flowchart illustrating the flow of the detailed cause analyzing process. Differences from the flowchart illustrated in FIG. 24 are steps S2801, S2802, and S2803.

In step S2801, the important feature map generating part 2601 acquires, from the inferring part 303, inferring part structural information at the time of inferring a label with the score-maximized refine image as an input. The important feature map generating part 2601 generates a gray-scaled important feature map based on the inferring part structural information, by using the selective BP method.

In step S2802, the cutting out part 2602 cuts out an image section corresponding to the changeable region from the gray-scaled important feature map.

In step S2803, the cutting out part 2602 generates a multiplication image by multiplying the difference image, the SSIM image, and the gray-scaled important feature map, from which the image sections corresponding to the changeable regions are cut out.

As is clear from the above description, the analysis apparatus 100 according to the fifth embodiment generates the difference image, the SSIM image, and the gray-scaled important feature map based on the incorrect inference image, the score-maximized refine image, and the inferring part structural information, and cuts out and multiplies the changeable region. As such, according to the fifth embodiment, it is possible to visually check an image section that causes incorrect inference in the changeable region in the unit of a pixel, with the analysis apparatus 100 according to the fifth embodiment.

The present invention is not limited to the configurations illustrated herein while the configurations exemplified according to the aforementioned embodiments may also be combined with other elements, for example. These aspects may be changed without departing from the gist of the present invention and appropriately set in accordance with applied modes thereof.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An analysis apparatus comprising:
   a memory configured to store program instructions; and
   a processor coupled to the memory, the processor being configured to perform the program instructions stored in the memory, the program instructions including:
   executing a refine image generating processing configured to generate a refine image having a maximized correct label score of inference from an incorrect inference image from which an incorrect label is inferred by a neural network;
   executing a map generating processing configured to generate a third map by superimposing a first map and a second map, the first map indicating pixels to each of which a change is made in generating the refine image, of a plurality of pixels of the incorrect inference image, the second map indicating a degree of attention for each local region in the refine image, the each local region being a region that has drawn attention at a time of inference by the neural network, the third map indicating a degree of importance for each pixel for inferring a correct label; and
   executing a specifying processing configured to specify a set of pixels that cause incorrect inference in the incorrect inference image, by calculating a pixel value of the third map for each set of pixels,
   wherein the map generating processing is configured to adjust the second map based on appearance frequency of each degree of attention.

2. The analysis apparatus according to claim 1,
wherein the map generating processing is configured to specify a pixel value with maximum appearance frequency of degree of attention and adjusts a map indicating the degree of attention of each of the pixels that has drawn attention at the time of inference, of the plurality of pixels of the refine image, so that the specified pixel value is zero.

3. The analysis apparatus according to claim 2,
wherein the map generating processing is configured to generate a map that indicates the degree of attention of each of the pixels that has drawn attention at the time of inference of the plurality of pixels of the refine image, by using any of a BP method, a GBP method, or a selective BP method.

4. The analysis apparatus according to claim 1,
wherein a multiplication image is visualized in the incorrect inference image, the multiplication image being obtained by multiplying:
an image obtained by cutting out a predetermined region from a difference image calculated based on a difference between the incorrect inference image and the refine image;
an image obtained by cutting out the predetermined region from an SSIM image obtained by performing SSIM calculation on the incorrect inference image and the refine image; and
an image obtained by cutting out the predetermined region from the second map.

5. A non-transitory computer-readable storage medium storing an analysis program which causes a processor to perform processing, the processing comprising:
executing a refine image generating processing configured to generate a refine image having a maximized correct label score of inference from an incorrect inference image from which an incorrect label is inferred by a neural network;
executing a map generating processing configured to generate a third map by superimposing a first map and a second map, the first map indicating pixels to each of which a change is made in generating the refine image, of a plurality of pixels of the incorrect inference image, the second map indicating a degree of attention for each local region in the refine image, the each local region being a region that has drawn attention at a time of inference by the neural network, and the third map indicating a degree of importance for each pixel for inferring a correct label; and
executing a specifying processing configured to specify a set of pixels that cause incorrect inference in the incorrect inference image, by calculating a pixel value of the third map for each set of pixels,
wherein the map generating processing is configured to adjust the second map based on appearance frequency of each degree of attention.

6. An analysis method implemented by a computer, the method comprising:
executing a refine image generating processing configured to generate a refine image having a maximized correct label score of inference from an incorrect inference image from which an incorrect label is inferred by a neural network;
executing a map generating processing configured to generate a third map by superimposing a first map and a second map, the first map indicating pixels to each of which a change is made in generating the refine image, of a plurality of pixels of the incorrect inference image, the second map indicating a degree of attention for each local region in the refine image, the each local region being a region that has drawn attention at a time of inference by the neural network, and the third map indicating a degree of importance for each pixel for inferring a correct label; and
executing a specifying processing configured to specify a set of pixels that cause incorrect inference in the incorrect inference image, by calculating a pixel value of the third map for each set of pixels,
wherein the map generating processing is configured to adjust the second map based on appearance frequency of each degree of attention.

* * * * *